US 11,248,184 B2

(12) United States Patent
Grainger et al.

(10) Patent No.: US 11,248,184 B2
(45) Date of Patent: Feb. 15, 2022

(54) GASIFICATION SYSTEM

(71) Applicant: Itero Technologies Limited, London (GB)

(72) Inventors: John Grainger, Greater London (GB); Geoff Smith, Greater London (GB)

(73) Assignee: Itero Technologies Limited, London (GB)

(*) Notice: Subject to any disclaimer, the term of this patent is extended or adjusted under 35 U.S.C. 154(b) by 459 days.

(21) Appl. No.: 15/572,592

(22) PCT Filed: Jun. 15, 2016

(86) PCT No.: PCT/GB2016/051785
§ 371 (c)(1),
(2) Date: Nov. 8, 2017

(87) PCT Pub. No.: WO2016/203232
PCT Pub. Date: Dec. 22, 2016

(65) Prior Publication Data
US 2018/0142174 A1    May 24, 2018

(30) Foreign Application Priority Data

Jun. 16, 2015 (GB) .................................... 1510555
Oct. 13, 2015 (GB) .................................... 1518108

(51) Int. Cl.
*C10L 3/08*        (2006.01)
*C10J 3/72*        (2006.01)
(Continued)

(52) U.S. Cl.
CPC ............... *C10L 3/08* (2013.01); *C10B 47/44* (2013.01); *C10B 53/02* (2013.01); *C10B 53/04* (2013.01);
(Continued)

(58) Field of Classification Search
CPC ..... C10J 3/002; C10J 3/30; C10J 3/302; C10J 3/721; C10J 2200/158; C10B 47/44
See application file for complete search history.

(56) References Cited

U.S. PATENT DOCUMENTS 4,347,119 A * 8/1982 Thomas .................... C10B 7/00
                                                           201/15
4,597,776 A   7/1986 Ullman et al.
(Continued)

FOREIGN PATENT DOCUMENTS

CN     101100621 A    1/2008
CN     103045307 A    4/2013
(Continued)

OTHER PUBLICATIONS

International Patent Application No. PCT/GB2016/051785, Search Report and Written Opinion, dated Nov. 21, 2016.
(Continued)

*Primary Examiner* — Matthew J Merkling
(74) *Attorney, Agent, or Firm* — Kilpatrick Townsend & Stockton LLP

(57) ABSTRACT

Processes and systems are provided for converting a carbonaceous feedstock into a reaction gas and a syngas, involving a step of pyrolysing and methanating the feedstock in a pyrolysis chamber to produce the reaction gas and a step of gasifying unconverted feedstock in the presence of a reactant to produce a syngas.

22 Claims, 8 Drawing Sheets

(51) Int. Cl.
*C10K 3/00* (2006.01)
*C10B 47/44* (2006.01)
*C10B 57/02* (2006.01)
*C10B 53/04* (2006.01)
*C10G 2/00* (2006.01)
*C10J 3/30* (2006.01)
*C10B 53/07* (2006.01)
*C10B 53/02* (2006.01)
*C10J 3/60* (2006.01)
*C10L 3/10* (2006.01)
*C10B 55/00* (2006.01)
*C10J 3/62* (2006.01)
*C10J 3/66* (2006.01)
*C10J 3/74* (2006.01)

(52) U.S. Cl.
CPC .......... *C10B 53/07* (2013.01); *C10B 55/00* (2013.01); *C10B 57/02* (2013.01); *C10G 2/30* (2013.01); *C10J 3/30* (2013.01); *C10J 3/60* (2013.01); *C10J 3/62* (2013.01); *C10J 3/66* (2013.01); *C10J 3/721* (2013.01); *C10J 3/74* (2013.01); *C10K 3/008* (2013.01); *C10L 3/10* (2013.01); *C10L 3/101* (2013.01); *C10J 2200/158* (2013.01); *C10J 2300/093* (2013.01); *C10J 2300/094* (2013.01); *C10J 2300/1276* (2013.01); *Y02E 50/10* (2013.01); *Y02E 50/30* (2013.01); *Y02P 20/143* (2015.11)

(56) References Cited

U.S. PATENT DOCUMENTS

| | | | | |
|---|---|---|---|---|
| 4,759,300 | A | 7/1988 | Hansen et al. | |
| 4,927,430 | A * | 5/1990 | Calderon | C10J 3/62 201/16 |
| 6,039,774 | A * | 3/2000 | McMullen | C10B 7/10 48/102 A |
| 6,178,899 | B1 * | 1/2001 | Kaneko | B01D 53/34 110/204 |
| 6,226,889 | B1 * | 5/2001 | Aulbaugh | B09B 3/00 110/229 |
| 6,619,214 | B2 * | 9/2003 | Walker | F23G 5/027 110/101 R |
| 8,137,508 | B2 * | 3/2012 | Grispin | C10G 9/005 201/25 |
| 8,282,787 | B2 | 10/2012 | Tucker | |
| 8,784,616 | B2 | 7/2014 | Tucker | |
| 9,394,484 | B2 * | 7/2016 | Reed | C01B 3/02 |
| 2001/0032717 | A1 * | 10/2001 | Busson | B01J 12/005 165/82 |
| 2008/0016769 | A1 | 1/2008 | Pearson | |
| 2008/0149471 | A1 | 6/2008 | Wolfe | |
| 2008/0307703 | A1 * | 12/2008 | Dietenberger | C10J 3/463 48/76 |
| 2011/0136971 | A1 | 6/2011 | Tucker | |
| 2012/0256130 | A1 | 10/2012 | Bell et al. | |
| 2012/0285814 | A1 * | 11/2012 | Del Monte | C10L 9/083 201/32 |
| 2013/0004409 | A1 | 1/2013 | Tucker | |
| 2014/0301934 | A1 | 10/2014 | Tucker | |
| 2016/0245508 | A1 * | 8/2016 | Massetti | F23G 5/0273 |

FOREIGN PATENT DOCUMENTS

| | | |
|---|---|---|
| EP | 0025319 A1 | 3/1981 |
| EP | 0867496 | 9/1998 |
| EP | 2440633 | 4/2012 |
| WO | 2009079681 | 7/2009 |
| WO | 2014090574 | 6/2014 |
| WO | 2014164545 A1 | 10/2014 |

OTHER PUBLICATIONS

Europe Patent Application No. 16731274.3, Examination Report, dated Oct. 15, 2019.
India Patent Application No. 201717042438, Examination Report, dated Feb. 18, 2020.
Europe Patent Application No. 16731274.3, Communication pursuant to Article 94(3) EPC (office action), dated Dec. 23, 2020.
China Patent Application No. 201680035328.4, Search Report, dated Jan. 18, 2021.

* cited by examiner

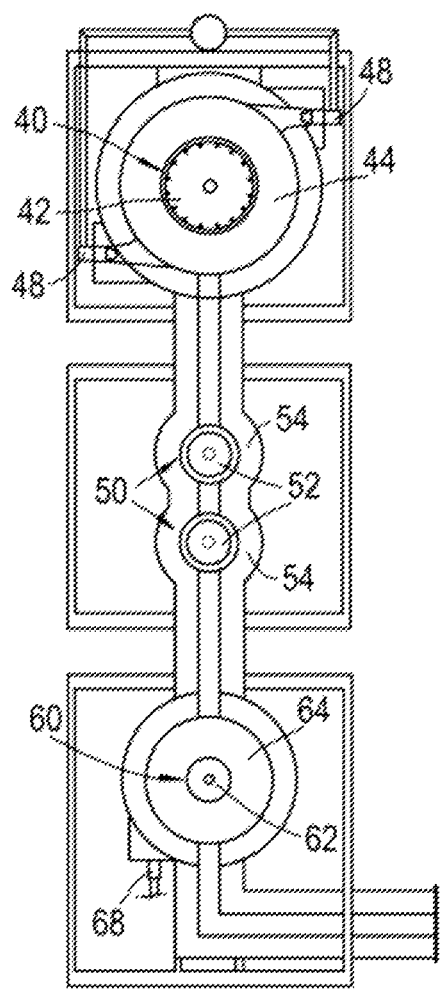

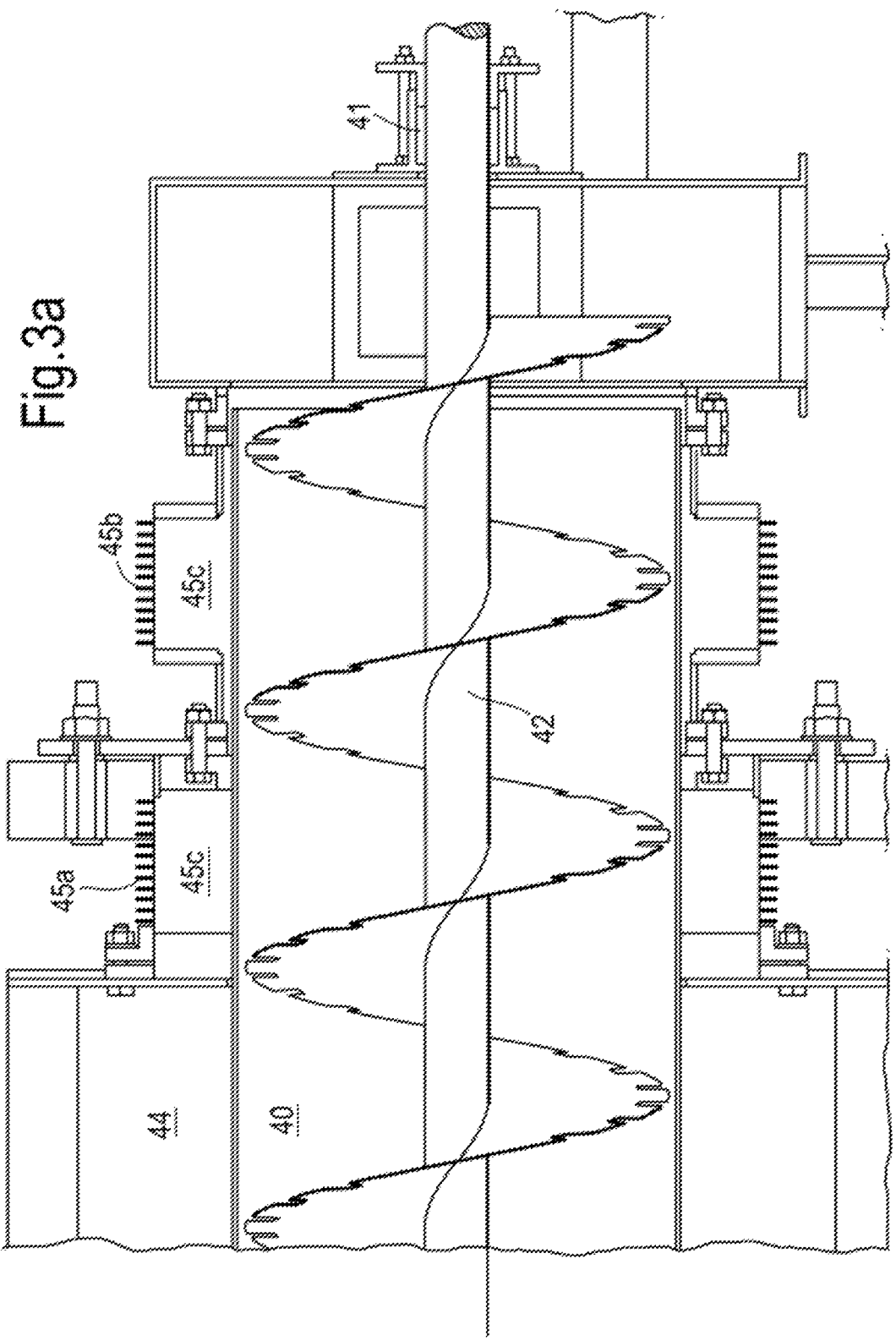

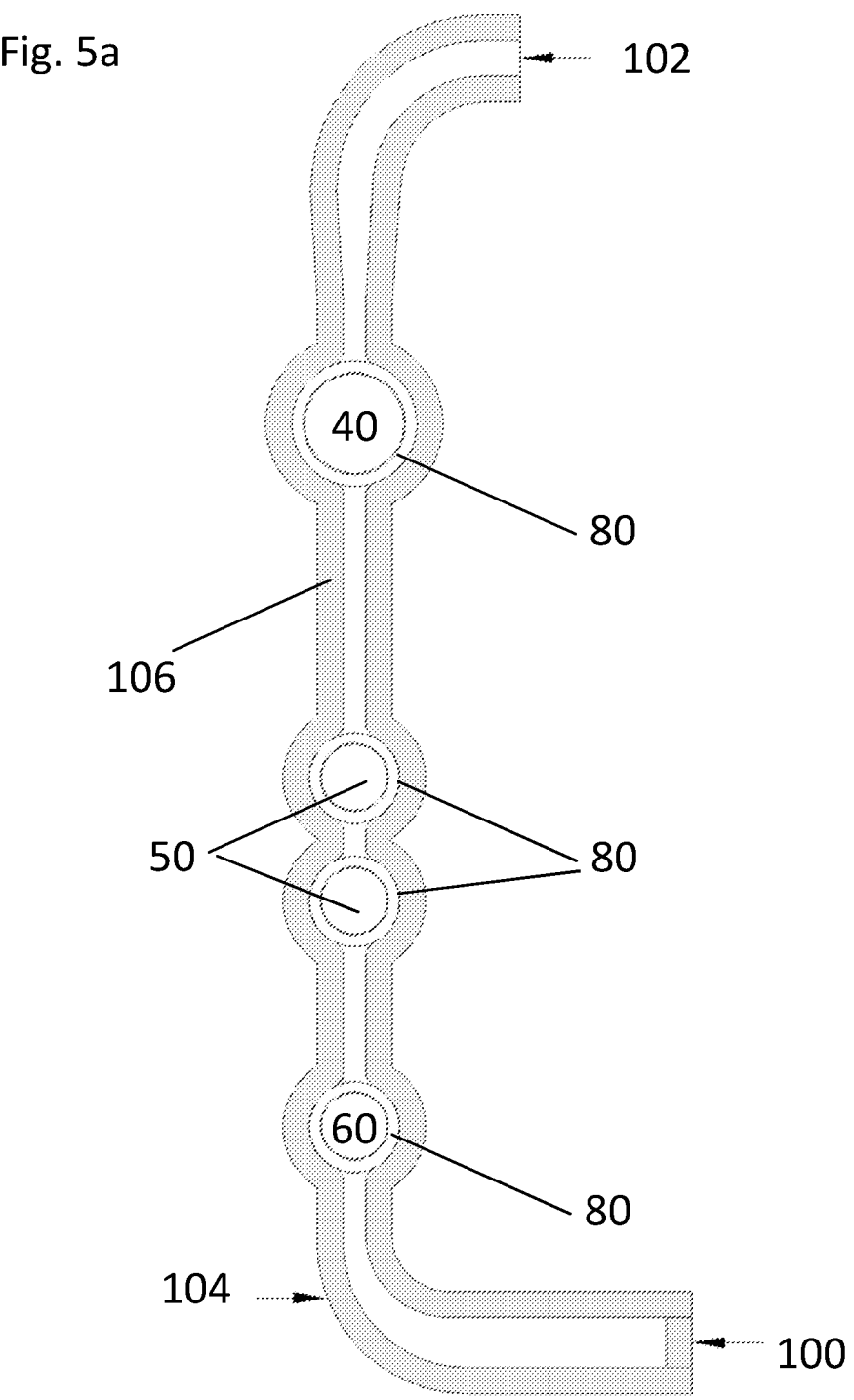

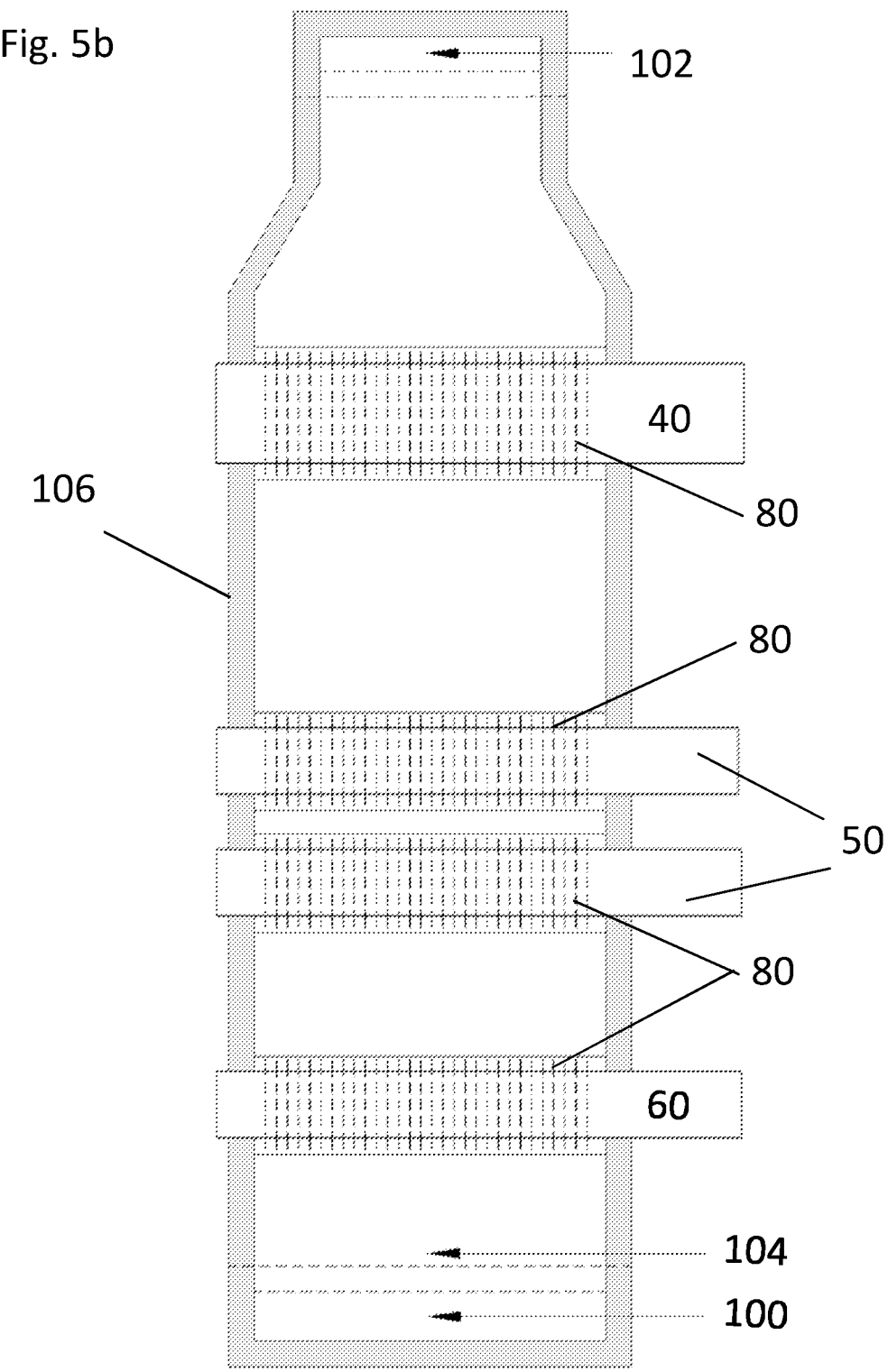

GASIFICATION SYSTEM

FIELD OF THE INVENTION

The invention relates to the field of gasification. More specifically, it relates to a pyrolysis system for gasification of carbonaceous feedstock.

BACKGROUND

There are many ways of disposing domestic and industrial organic waste, including landfill and incineration. However, landfill requires dedicated landmass and often incurs negative social and environmental impact, whilst disposal by incineration involves substantial energy cost. In addition, both routes produce greenhouse gases from either decomposition or combustion. Alternatively, carbonaceous waste may be converted into biofuel by aerobic and anaerobic digestion. However the drawback for both routes is low process efficiency, i.e. their residence time often runs into days and weeks. In addition, aerobic digestion requires a significant investment for constructing and maintaining a sizable lagoon.

High temperature pyrolysis, on the other hand, is an efficient continuous process that converts carbonaceous feed into methane and other fuel gases. Although high temperature pyrolysis demands significant energy input to achieve the required process temperature, it is met by part of the methane gas produced and therefore the process is self-sustainable. It is also carbon neutral when a biomass is used as the carbonaceous feedstock. Partial or complete pyrolysis of carbonaceous feedstock is well known in the art, for example U.S. Pat. No. 4,759,300 (Hansen) and WO2014/090574A (Beech et al.). U.S. Pat. No. 8,282,787B and US2013/0004409A (Tucker) teaches a pyrolysis system that utilizes a temperature controlled retort chamber built with helical auger, wherein activated carbon produced from the pyrolysis process is applied to filter and sequester noxious gas. In another application, US2014/0301934 (Tucker) teaches a pyrolysis system with a catalyst coated auger for promoting methanation process, as well as a method for producing carbon nanotubes.

In addition to the organic waste, fossil fuels such as coal and bitumen may be utilised as the carbonaceous feed for a pyrolysis/gasification process to produce high quality methane gas. For example coal powder from slags, typically having a particle size of less than 5 mm and so presents a significant explosion risk in storage and transportation, can be processed using a gasification process. However, the product gas produced from conventional gasification process typically has an unfavorable low methane concentration.

The high temperature environment in pyrolysis converts carbonaceous feedstock into long chain hydrocarbons (e.g. primary and secondary tar) before cracking them into short chain hydrocarbons, hydrogen and tertiary tar.

Primary tar is generally characterised by compounds derived directly from the thermal treatment (pyrolysis in this case) of organic feedstock, for example cyclohexanone, guaiacol or formic acid. Secondary tar is generally characterised by phenols and olefins. Tertiary tar is characterised by aromatic compounds without oxygen constituents which may be alkalised (e.g. toluene, indene) or 'condensed' products such as polyaromatic hydrocarbons with no substituents (e.g. naphthalene, phenanthrene).

The thermal cracking of long chain hydrocarbons, efficient at a temperature above 1000° C., results in an increased pool of hydrogen, as well as formation of methane. However at a slightly elevated temperature (i.e. >1100° C.), typically at hot spots in the pyrolysis chamber, any methane produced may be pyrolysed. As a result pyrolysis at excessively high temperature produces a significant amount of waste tar in the product gas, lowers product gas purity.

Methanation may be defined as a physical-chemical process to generate methane from a mixture of various gases out of thermo-chemical gasification. Thermal cracking of tar is efficient at 950-1100° C. in the presence of nickel catalyst, but most pyrolysis techniques currently operate at a lower temperature; however operating at this lowered temperature reduces cracking efficiency, i.e. it reduces the cracking of said primary, secondary, and tertiary tar, effectively reducing the amount of available carbon and hydrogen for subsequent methanation.

EP2440633 and U.S. Pat. No. 8,784,616B (Tucker) teach a retort barrel where heating chamber is divided into multiple sections to provide a varying temperature profile along the barrel. In the example illustrated, the dividing walls are moveable in the axial direction; as such the residence time of feedstock and product gas in each section is adjustable by varying the section length. The varying temperature profile allows methanation to be decoupled from the pyrolysis and cracking stage, thus resulting in a better yield. However due to the lower temperatures in the methanation chamber, any primary tar and secondary tar released therein, as well as some tertiary tar are withdrawn from the reaction chamber along with the product gas. Even though the tars can be scrubbed from the product gas in subsequent separation units, such a system leads to a lower yield and higher tar disposal cost.

As a result, a high yield process that produces a high methane concentration product gas and cracks any residual tar for further methanation is highly desirable.

SUMMARY

The present applicant has mitigated the above problems by providing a gasification system and devising a process utilising that system.

Processes according to the present invention are directed towards converting a carbonaceous feedstock into a reaction. Such processes comprise the step of:
  i) pyrolysing and methanating the feedstock to produce a reaction gas in at least one pyrolysis chamber, wherein the at least one pyrolysis chamber operates at a temperature at or above 850° C. (preferably at or above 950° C.).

Preferably, the carbonaceous feedstock comprises coal. Preferably, the reaction gas comprises methane.

Some processes according to the present invention further comprise the steps of
  ii) removing the reaction gas from the at least one pyrolysis chamber,
  iii) gasifying the unconverted feedstock from the at least one pyrolysis chamber to produce a syngas in at least one gasification chamber, wherein the at least one gasification chamber comprises one or more reactant injection ports for injecting reactant to enable gasification and operates at a temperature between 700-1100° C.
  iv) removing the syngas from the at least one gasification chamber.

In such processes, preferably, the syngas comprises at least one of tar, hydrogen and carbonmonoxide. In such processes, preferably, the reactant comprises at least one of steam, hydrogen, oxygen and air. In such processes, preferably the process includes a step of separating a hydrocarbon having a carbon number of at least two from the reactant gas and the syngas to form a product gas and a purified syngas respectively. Where this is the case the hydrocarbon is preferably tar. The hydrocarbon is preferably introduced to inlet ports of the pyrolysis chamber and/or gasification chamber.

Where a purified syngas is produced, it is preferable that a portion of the product gas and/or purified syngas is supplied to the at least one pyrolysis chamber and/or the at least one gasification chamber for pressurising said pyrolysis and/or gasification chamber(s).

Where a purified syngas is produced, it is preferable that the reactant gas and the syngas is combined prior to the step of separating the hydrocarbon.

Some processes according to the present invention take place using a pyrolysis chamber comprising a catalytic surface and operating at a temperature from 850° C. to 1100° C., preferably 950° C. to 1100° C., and futher comprise the steps of:
  ii) removing the reaction gas from at least one of the at least one outlets of the pyrolysis chamber,
  iii) separating the reaction gas into a product gas portion and a portion for further processing,
  iv) circulating the portion for further processing into at least one of the at least one inlet of the pyrolysis chamber for further processing,
  v) recovering the product gas portion.

Where this is the case, it is preferable that the reaction gas further comprise at least one hydrocarbon having a carbon number of at least two (preferably tar; where it is tar, it is preferable that the product gas comprise a substantially higher methane content than the reaction gas, and the portion for further processing comprises a substantially higher tar content than the reaction gas).

Where such processes are used, it is preferable that a portion of the product gas is supplied to the pyrolysis chamber for pressurizing said pyrolysis chamber. Where this is the case, it is preferable that the portion of the product gas is preheated prior to supplying to the pyrolysis chamber.

Some processes according to the present invention further comprise a step of conditioning the feedstock prior to pyrolysis; wherein said the conditioning step comprising any of the sorting, filtering, shredding and drying of feedstock in a feed preparation system.

The invention also relates to systems for carrying out the processes as explained above, in particular systems wherein the system comprises a primary chamber, secondary chamber, and tertiary chamber; wherein the at least one pyrolysis chamber comprises the primary chamber; wherein the primary chamber, secondary chamber and tertiary chamber are serially connected; and wherein the primary chamber operates at or above 850° C. (preferably above 950° C.) to promote the pyrolysis of feedstock and cracking of tar.

Some systems according to the present invention further comprise at least one gasification chamber, wherein the at least one gasification chamber comprises the tertiary chamber; wherein either the pyrolysis chamber or the gasification chamber further comprises the secondary chamber; and wherein the modular dimensions of all the chambers are selected in accordance with throughput requirement, residence time requirements of both feedstock and gases and total surface contact area requirements of a catalyst with the feedstock and gases.

In some systems according to the present invention the secondary chamber operates at between 700° C. and 900° C. to promote the methanation of reaction gas; and wherein the tertiary chamber operates between 700° C. and 1100° C. to promote the gasification of unconverted feedstock. Where this is the case, it is preferable that the secondary chamber comprises an outlet operable to allow removal of reaction gas, and the tertiary chamber comprises an outlet operable to allow removal of gas, and preferable that the primary chamber operates between 850° C. and 1100° C. (preferably between 950° C. and 1100° C.) to promote the pyrolysis of feedstock and cracking of tar. Where the primary chamber operates at such temperatures in such systems, it is preferable that the modular dimensions of all the chambers are selected in accordance with throughput requirement, residence time requirements of both feedstock and gases and total surface contact area requirements of a catalyst with the feedstock and gases. Where this is the case, it is preferable that the reaction gas is removed from the outlet of the secondary chamber for separation of reaction gas into product gas and a portion for further processing; and the portion for further processing is introduced through the inlet of the tertiary chamber. It is also preferable that the reaction gas and tar removed from the outlet of the tertiary chamber is reintroduced to the system at the inlet of the primary chamber.

In some systems according to the present invention, the primary chamber operates at or above 850° C. (preferably at or above 950° C.) to promote the pyrolysis of feedstock and cracking of tar; and the secondary chamber and tertiary chamber operate between 700° C. and 1100° C. to promote the gasification of unconverted feedstock. Where this is the case, it is preferable that the primary chamber comprises an outlet operable to allow removal of reaction gas; and wherein the secondary and/or tertiary chamber comprises an outlet operable to allow removal of syngas.

In some systems according to the present invention, each of the primary chamber, secondary chamber and tertiary chamber comprises at least one barrel, and each of the barrels comprises an auger for conveying the feedstock and reaction gas within each of the barrels. Where this is the case, it is preferable for the system to further comprise resultant chambers between each of the serially connected barrels to provide buffering capacity, and preferable that each of the barrels comprises a heating jacket in fluid communication with each other. Where heating jackets are used, it is preferable for the system to further comprise shock absorbing mechanisms at the connections between each of the heating jackets and barrels, as well as each of the barrels and resultant chambers. Where this is the case, it is preferable that the shock absorbing mechanism is or comprises bellows.

In systems according to the present invention it is preferable for the system to further comprise an annulus comprising:
  a) walls comprising refractory material; and
  b) a burner box comprising burners;
configured so that in use a uniform flow of gases flows over the exterior of the chambers sequentially from secondary chamber to primary chamber or from tertiary chamber to secondary chamber to primary chamber.

BRIEF DESCRIPTION OF THE DRAWINGS

Further features and aspects of the present disclosure will be apparent from the following detailed description of illustrative and non-limitative embodiments, with reference to the drawings, in which:

FIGS. 1a and 1b depict a gasification system according to the present disclosure.

FIGS. 3a and 3b depict a joint comprising a shock absorbing mechanism according to the present disclosure.

FIGS. 5a and 5b depict in simplified form a system according to the present disclosure comprising an annulus.

DETAILED DESCRIPTION

Figure 1A:
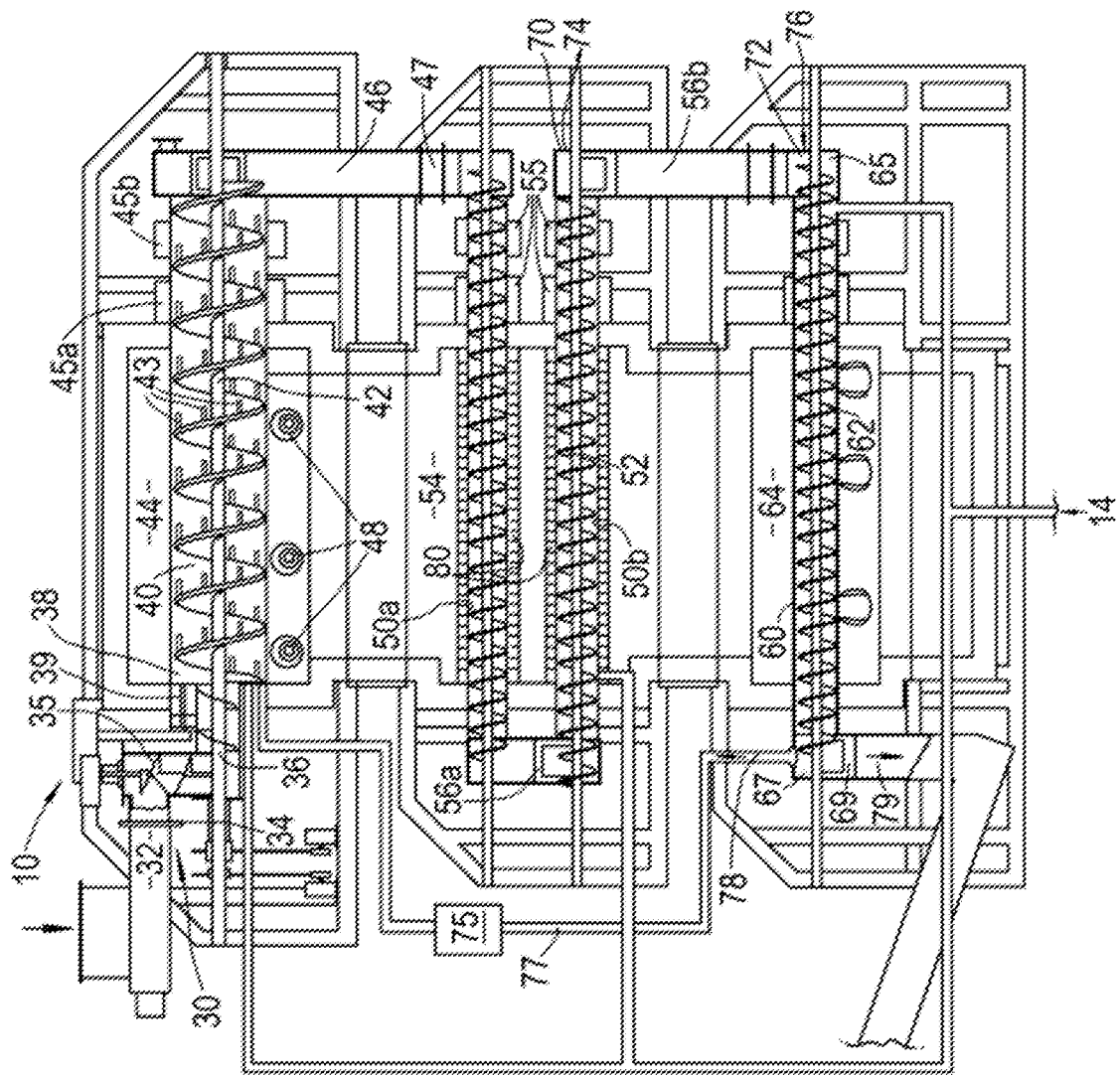
Figure 2:
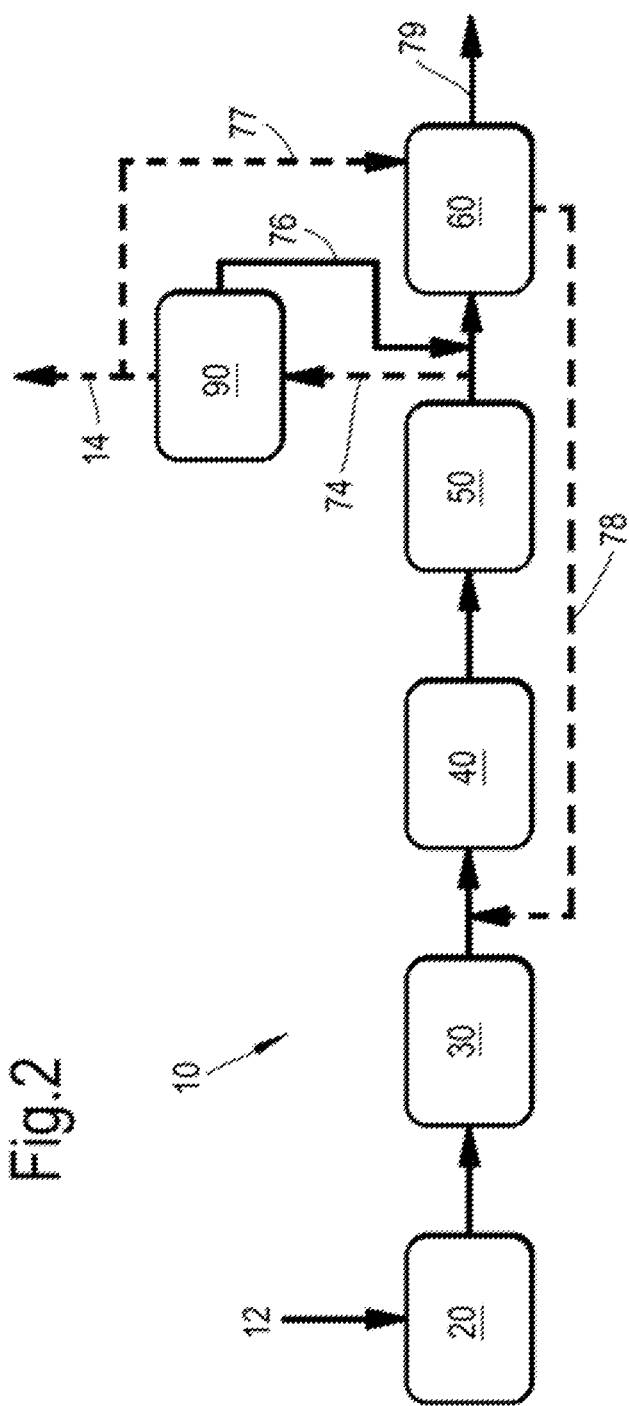
FIG. 2 depicts a process flow diagram according to the present disclosure.

An embodiment of the gasification system 10 according to the present disclosure is shown in FIG. 1a, FIG. 1b; the system is capable of being used in a process according to the process flow diagram of FIG. 2 for generation of a product gas 14 from a carbonaceous feedstock 12. The gasification system 10 comprises a preparation system 20 (not shown in FIGS. 1a and 1b for clarity) for conditioning the feedstock, a feeding system 30 for feeding the conditioned feedstock to a plurality of serially connected cylindrical chambers 40,50, 60, and a separating unit 90 for separating vaporized tar from the product gas. Each of the cylindrical chambers 40, 50, 60 comprises a helical screw 42,52,62, which are used to convey the feedstock through the cylinders 40,50,60. The temperature in each of the serially connected cylindrical chambers 40,50,60 is independently controlled by their own heating jackets 44,54,64 in order to provide favorable process conditions to promote either pyrolysis or methanation processes. As more product gases are generated the chambers 40,50,60 are pressurised. The product gas 74 comprises tar and methane, and may be extracted to a downstream separation unit 90 from a gas extraction point 70 at the exit of secondary chambers 50. At the downstream separation unit 90 the majority of tar and impurities are removed from the product gas, and as a result producing a high purity methane product 14.

In this particular embodiment the serially connected cylindrical chambers comprise a primary chamber 40, a secondary chamber 50 and a tertiary chamber 60, each tasked with a specific duty. The primary chamber 40 provides a high temperature (>850° C., preferably >950° C.) environment for carbonaceous feedstock pyrolysis, as well as the cracking of tar released during the pyrolysis process. The majority of methane production, however, is carried out in the secondary chambers 50 at a lower temperature (<900° C.). A stream of recycled tars 76 (primary, secondary and tertiary), stripped from product gas at the downstream separation unit 90, is re-introduced into the process at the entrance 72 of tertiary chamber 60. Along with the residue solids discharged from the secondary chambers 50, the extracted tars 76 are further pyrolysed, cracked and methanated in the high temperature tertiary chamber 60. A small amount of clean product gas 14, is fed to the tertiary chamber 60 and/or to the primary chamber 40 and secondary chambers 50 to provide pressure control of the reaction chambers 40,50,60. All clean product gas is pre-heated via a combustion gas exhaust manifold prior to injection into chambers to minimise temperature drop within the chambers. The product gas 78 has a rich tar content, and exits the tertiary chamber 60 to be reintroduced at the entrance to the primary chamber 40 for further cracking. The remainder of unconverted feedstock 79, which is high in inorganic content, is disposed of at the system outlet 69.

Recycling the tars initially at the tertiary chamber 60 followed by the primary chamber 40 and or secondary chambers 50, subject to gas quality, permits a longer residence time and releases more tars to be cracked for subsequent methanation. Removing and recycling the tars also increases purity of methane gas, as well as reducing the cost of tar disposal.

The process starts at the preparation system 20 so that the feedstock, often with fluctuating quality, may be conditioned to a consistent quality. Prior to its entrance to the feeding system 30, the carbonaceous feedstock is first prepared in a preparation system 20 to remove all metal contents and bulky inert objects, for example by using magnetic screens and/or an induction sorting system, or any devices known to the person skilled in the art. The preparation system 20 also shreds the feedstock into consistent particle sizes, for example using a shredder and/or a granulator, and in the process liberates and removes more metallic contents and bulky inert objects; this minimises the energy consumption arising from inert material. The shredded feedstock is then processed through a thermally controlled dryer, resulting a feedstock of <5% moisture content; a feedstock with low moisture content reduces steam generation in the chambers 40,50,60 and helps to control the inert atmosphere, as well as lowering oxygen levels for an efficient gas conversion.

The thermally controlled dryer may comprise gas burners that run on natural gas, product gas or syngas, or it can feature any heaters known to the person in the art, for example it can include electric heating elements, microwave or infrared radiators, or integrated heat exchangers utilizing waste heat from the gasification system 10 or any other heat source. In some examples, the thermally controlled dryer further comprises an integrated moisture control system for adjusting the feedstock flow rate and moisture levels according to system requirements.

It has been found that preparing and controlling feedstock particle size and moisture content enables efficient heat transfer and gas conversion.

In some embodiments, an intermediate system feed hopper is installed to collect the dried and shredded feedstock from the preparation system 20. The use of an intermediate system feed hopper provides buffering capacity, should the feedstock output to the feeding system 30 be interrupted. The feeding system 30 utilises a cantilever auger screw compression device to create an airlock; this is accomplished by compressing the incoming feedstock to form a compressed plug. Its operation is critical as any air entrainment into the primary chamber 40 affects the efficiency of the gasification process, as well as reducing the purity of the final product gas. For example the presence of oxygen in the heated chambers leads to combustion, which in turn creates by-products such as carbon monoxide and carbon dioxide. Along with entrained nitrogen, the by-products and impurities reduces the calorific value of the product gas.

The feeding system 30 further comprises a pressure hydraulic control flap 34 at its exit, which releases feedstock into a vertical feed throat 35. A high speed feed auger screw 36 is provided for controlled delivery of feedstock to the primary chamber 40, taking into account of process parameters such as feedstock flow rate, bulk density and heat transfer properties. This serves to feed the primary chamber 40 with appropriate feed flow for optimal gas conversion.

In the illustrated embodiment, as shown in FIGS. 1a and 1b, the chambers 40,50,60 are vertically stacked to encourage the efficient circulation of hot gases among the heating jackets 44,54,64 of adjacent chambers. In addition, gravity helps to convey feedstock and residual products to the subsequent chambers in the vertically stacked formation; as a result conveying means such as augers may be omitted between adjacent chambers, reducing the process complexity and the maintenance cost associated with it. Furthermore, the resultant chambers 46,56a,56b connecting adjacent chambers provide additional buffering capacity; the mass of feedstock built up in the resultant chambers 46,56a,56b creates a pressure head to ensure the feedstock is fed properly into the subsequent augers.

The operating temperature in each of the chambers 40,50, 60 is controlled by their own heating jackets 44,54,64. In the illustrated embodiment, a plurality of heaters 48 are located within the heating jacket of the primary chamber, where heated air or combustion gas is sequentially drawn through the heating jackets of secondary 54 and tertiary 64 chambers to provide heating therein using a downstream induced draft fan. The position of the plurality of chamber heaters 48 ensures thermal vortexes are formed around the exterior surface of the barrel, thus eliminating potential hotspots or dead zones. The axial positioning of heaters 48 allows an even distribution and circulation of combustion gases along the length of primary chamber 40.

Each of the heating jackets of reactor chambers 44,54,64 are independently insulated using advanced ceramic fiber or any insulating material known to the person skilled in the art. To facilitate heat distribution, exhaust ports are installed to connect the heating jackets of the primary chamber 44 to that of the secondary chamber 54, as well as the heating jackets of the secondary chamber 54 to that of the tertiary chamber 64; said exhaust ports provide sufficient cross sectional area to minimise constriction to the hot combustion gases flow.

The heaters 48 can be gas burners fuelled by the product gas as shown in FIG. 1a to allow self-sufficiency of the process, or by an external supply of propane or town gas (a fuel gas commonly supplied domestically), or it can be any heating element known to the skilled person in the art, for example, electric heating elements, microwave or infrared radiators, as well as heat exchangers utilizing waste heat from other processes such as combined heat and power (CHP) generators. Since most of the required thermal energy for pyrolysis takes place within the first half of the primary chamber 40, in order to raise the temperature of entering feedstock to the required set point, the heaters 48 are positioned towards the entrance of barrel 40; this results in a linear temperature profile along the length of barrel 40. However the axial positions of the heaters 48 need not be as illustrated in FIG. 1a. The heating rate is controlled by the use of feedback control system comprising one or more temperature sensors installed within the each of the chambers, and are controlled according to process condition including feedstock throughput, type of feedstock, as well as the process requirement.

In the illustrated system, the primary chamber 40 operates at a higher temperature than the secondary chambers 50. For example, the internal temperature of the primary chamber 40 is controlled at or around 850° C. to 1100° C., preferably at or around 950° C. to 1100° C. (for example 1050° C.) to promote high temperature pyrolysis and cracking, where the feedstock releases primary tar, secondary and/or tertiary tar. In addition, the reaction gas 78 comprising tar and methane from the tertiary chamber 60 are reintroduced at the entrance 38 of the primary chamber so that any recycled tar or tar released in the tertiary chamber 60 can be reprocessed in the primary chamber 40. Under the prescribed condition, a portion of the released primary tar is cracked into secondary and tertiary tar, which form part of the raw material for subsequent methanation. Furthermore, partial cracking of tertiary tar and partial methanation takes place here. Since high temperature plays a vital role for effective cracking, in some embodiments, a dense cast ceramic refractory end cap 39 is installed at the inlet of the primary chamber 40, which acts as a containment barrier to minimize heat loss from the primary chamber 40 to the feedstock in the preceding feeding system 30.

The secondary chambers 50 on the other hand operate at around temperature ranged from 700° C. to 900° C. (for example around 800° C.) to favor the methanation of the carbon and hydrogen containing species released from chemical ingredients created from the pyrolysis process. The lower operation temperatures in the secondary chambers 50 means the exhaust air from the heating jacket in the primary chamber 44 can be drawn and utilized for heating in subsequent chambers 50,60. Here the vertical stack formation permits hot air to be drawn through the multiple chambers sequentially. In some embodiments, either or both of the secondary 50 and tertiary 60 chambers further comprise heaters to cater for additional energy requirement that may arise; for example when the gasification system processes a feedstock with high specific heat capacity or if the system 10 encounters an excessive heat loss. In some embodiments, the exterior wall of the secondary 50 chamber and/or tertiary chamber 60 comprises fins 80 to aid heat absorption from the combustion gas.

In some embodiments, either or both of the chamber barrels 40,50,60 and augers 42,52,62 are made of Inconel 617 alloy, Nickel Alloy 230 or any suitable nickel containing alloy with suitable thermal, catalytic, and anti-corrosive properties. For example, Inconel 617 and Nickel Alloy 230 retain their tensile strength over a wide temperature range; as such, under operating conditions the auger and barrel does not deform or degrade under load. In addition these alloys contain a high amount of nickel, so that their catalytic properties aid tar processing and methanation.

In some embodiments the auger 42 in the primary chamber 40 comprises agitators 43 to promote feedstock circulation and gas convection, as such aiding heat transfer and maximising contact between feedstock, catalytic surface and gas. The agitators 43 can be any mixers known to the person skilled in the art, for example paddles and fingers. To aid mixing, the paddles have been positioned on the leading edge of the auger fighting to circulate the feedstock efficiently within the chamber. In operation, the agitators 43 also reduce the thickness of the char deposited on the inner barrel walls, increasing the overall heat transfer efficiency. In addition to the paddles, reintroducing hot and pressurised product gas at the entrance of the primary chamber 40 increases gas turbulence which increases heat transfer by convection. The combined effect of the circulation paddles and product gas recirculation greatly enhances the pyrolysis conversion rate by maximising heat transfer within a given resident time. In some embodiments, high surface area nickel alloy brushes are installed at the edges of the screw flightings for scraping the surface walls and remove any carbon deposited therein.

Figure 3B:
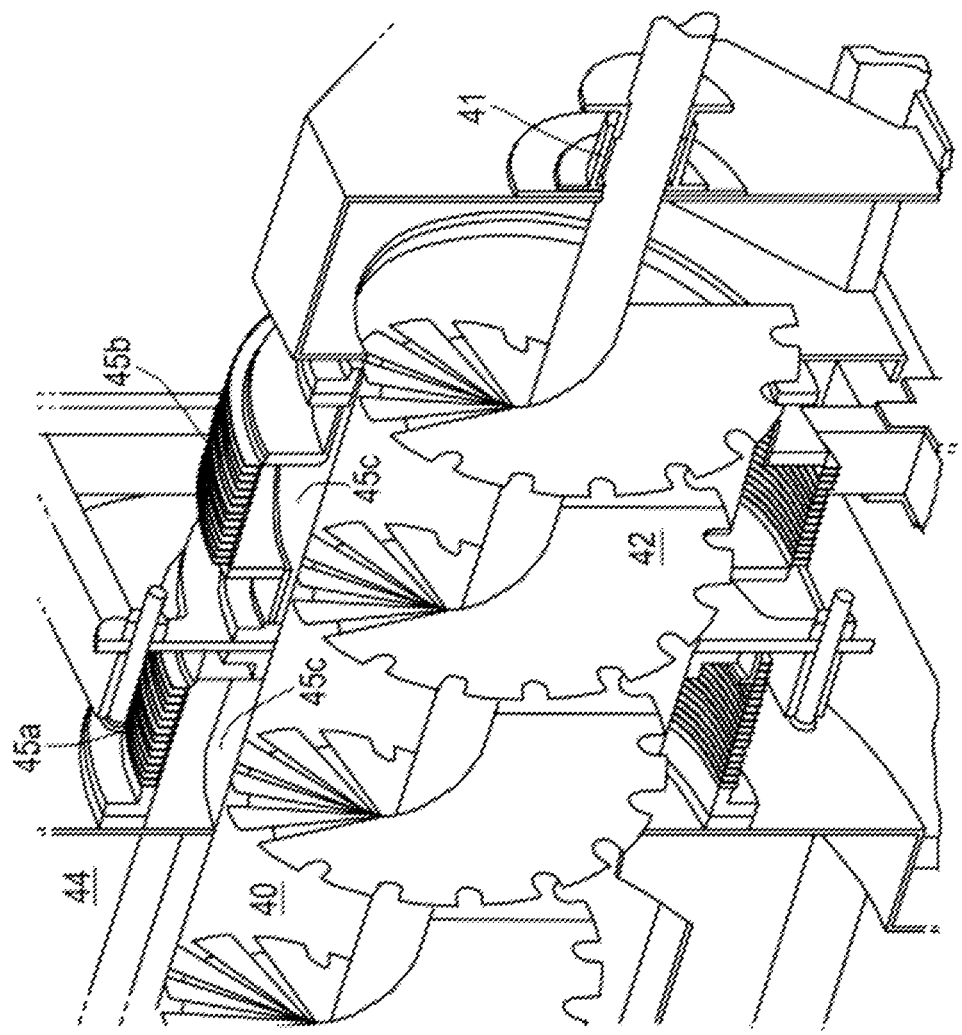

The rate of thermal expansion of the auger screw 42 and primary chamber barrel 40 may be different because of several reasons. For example, they may be manufactured from different materials, or they may operate at different temperature due to heat losses to the incoming feedstock. To compensate and to prevent equipment damage, the auger and barrel are only fixed rigidly at the end with feedstock input, as such thermal expansion only takes place in horizontal direction. The auger screw 42 is supported at the other end towards the chamber exit; any movement due to expansion causes the auger screw to slip through a set of bearings 41 without creating any stress points in the system as shown in FIGS. 3a & 3b. Any thermal expansion in the horizontal and radial direction is absorbed by a double contraction/expansion bellows system 45a, 45b. The bellows system also provides gas tight seals to prevent cross contamination between the exhaust gas in the heating jacket 44 and the product gas in the chamber 40. Since they are not exposed to as high a temperature as the auger and barrel, the bellows 45a, 45b may be manufactured from a cheaper material such as stainless steel 316 or any suitable material. The bellows system further comprises thermal ceramic insulation 45c in order to minimise the heat loss at the bellows 45a,45b; a lowered bellow temperature reduces the thermal expansion, and thus enhancing the longevity of the bellows 45a,45b.

Upon leaving the primary chamber 40 the residual materials, unconverted feedstock and product gases are conveyed into a thermally insulated primary resultant chamber 46 before feeding into the secondary chambers 50. As with the primary chamber 40, the joints connecting the primary resultant chamber are fitted with additional bellows 47 to compensate for thermal expansion.

The operating temperature in the second chambers 50 are reduced to a temperature in the range 700-900° C. (for example 800° C.); at this lowered temperature the methanation of the carbon and hydrogen containing species released from the chemical ingredients created from the pyrolysis process is more efficient when compared to the pyrolysis temperature of 850-1100° C. (preferably 950-1100° C.).

As a result of pyrolysis conversion in the primary chamber 40, throughput of solid feedstock entering the secondary chambers 50 is significantly less than that entering the primary chamber 40. Therefore, in the illustrated embodiment, the secondary chambers 50 are constructed with a smaller bore to account for the reduction in solid flow; the reduction in barrel size allows two serially connected chamber barrels 50 to be installed in a vertical stack formation; this lengthens the residence time for methanation process, as well as further pyrolysis on any unconverted carbonaceous feedstock and the cracking of tars. The two secondary chambers 50 comprise screws 52 with decreased flighting pitch compared to the screw 42 installed at the primary chamber 40 in order to maximise feedstock and catalyst contact.

On exit of the first of secondary chamber 50a, the residual materials, product gases and unconverted feedstock pass through an inter-stage resultant chamber 56a and are fed into the second of the two secondary chambers 50b. The two secondary chambers 50a, 50b are identical in dimension and design but they can be sized independently according to process requirement. On exit of the second of the two secondary chambers 50b the residual materials, product gases and unconverted feedstock are passed into secondary resultant chamber 56b prior to entering the tertiary chamber 60. The secondary resultant chamber 56b incorporates a gas take off valve/port 70 for withdrawal of product gas. Since the chambers 40,50,60 operate under positive pressure the majority of product gas produced are conveyed to the downstream separation unit 90 by differential pressure. The gas take off valve/port 70 serves to be the only outlet port for extracting gas from the gasification system. As per the primary chamber 40 a double contraction/expansion bellows system is applied to the secondary chambers 50 to compensate for horizontal and radial thermal expansion.

Optionally, at this stage the remaining gaseous material may be diverted into an associated module for further processing. The associated module may be any separator including a gas conditioner, a catalytic converter, a fractional distillation rig, gas scrubber, absorption device, membrane gas separator, gas concentrator, condenser or any other equipment utilised to treat gases. Alternatively, the remaining gaseous material may be released through an exhaust system, for example a gas flare.

All remaining solid material, with the assistance of gravity, passes through the secondary resultant chamber 72 into a high temperature ceramic double dump valve (although any other extraction device known to the person skilled in the art may be used, for example a rotary valve). The double dump valve has been designed in accordance with the residual material flow rate to release the solid material into the tertiary chamber without entraining any of its gas that may contaminate the inert atmosphere in the secondary chambers 50.

The tertiary chamber 60 operates at a temperature in the range 950-1100° C. (for example, 1050° C.) to optimise gas methanation, cracking of primary, secondary and tertiary tars, as well as carrying out a final stage pyrolysis of all remaining residue material. Or alternatively the tertiary chamber 60 can operate at the lower temperature range of 700-900° C. to optimise methanation.

The tertiary chamber 60 comprises an additional inlet port 72 at the entrance of the chamber for reintroducing the tars that have been separated from the product gas back to the system 10. In some embodiments, the inlet port 72 may further comprise an inlet for introduction of cleaned product gas to control the internal pressure of the gasification system; the said internal pressure is controlled at substantially 0.3 barg or any pressure above atmospheric pressure. The tertiary chamber 60 further comprises injection ports 65 for controlled introduction of steam, hydrogen, oxygen, air or any other desired inputs, in order to recondition the residual feedstock as required. An additional gas take off port 67 may be installed to remove syngas production under gasification operation.

The tertiary chamber heating jacket 64 utilises any waste heat exhausted from the secondary chamber heating jacket 54. In some embodiments it further comprises at least one heater 68 for raising the temperature in the tertiary chamber 60 to the required set point. As with the heaters 48 in the primary chamber heating jacket 44, the heaters 68 within the combustion void 64 are angled and positioned to ensure combustion gases create an equal energy distribution via a gas vortex around the external surface of the tertiary chamber barrel 60. This eliminates the possibility of thermal hotspots or dead zones.

The tertiary chamber 60 further comprises a product gas feed pipe 77 in connection with the main primary chamber 40; optionally said product gas feed pipe further comprises a sintered nickel filter 75 or any filter with catalytic properties for further filtering the product gas and to promote methanation. The tertiary chamber heating jacket 64 incorporates an exhaust manifold and evacuation chamber for extracting the combustion gases from the reactor chamber system. The tertiary chamber heating jacket 64 may further comprise a preheat product gas pipe for preheating the product gas prior to entering any of the chambers 40,50,60.

The exhaust manifold and evacuation chamber comprises an independent flow control flap downstream as well as an internal temperature monitoring system for monitoring and controlling combustion gas flow rates with respect to the temperature readings in all of the chambers 40,50,60.

The tertiary chamber 60 also houses a high temperature double dump valve or any other extraction device known to the person skilled in the art to remove any residue and inert matter at its outlet 69 without entraining any of the atmospheric air downstream.

The gasification system may alternatively be used for pyrolysis and gasification of waste coal from slag or any other carbonaceous feedstock with relatively high fixed carbon content. The particle sizes of said fixed carbon components typically range from microns to 5 mm and may be conditioned and fed to the gasification system using the preparation system 20 and feeding system 30. The gasification system enables the conversion of volatile components of the powered coal into a high quality methane gas through a pyrolysis stage, before converting the remaining fixed carbon content into a syngas through a subsequent gasification stage, with the addition of a reagent such as oxygen or steam. In this embodiment the tertiary chamber may be designated to carry out gasification, whilst the secondary chamber is able to switch between methanation and gasification operation depending on process conditions and feedstock composition, i.e. the amount of fixed carbon content in feedstock. For example, in the case where fixed carbon content in the feedstock is high, the secondary chamber is able to provide additional space to carry out gasification.

Figure 4:
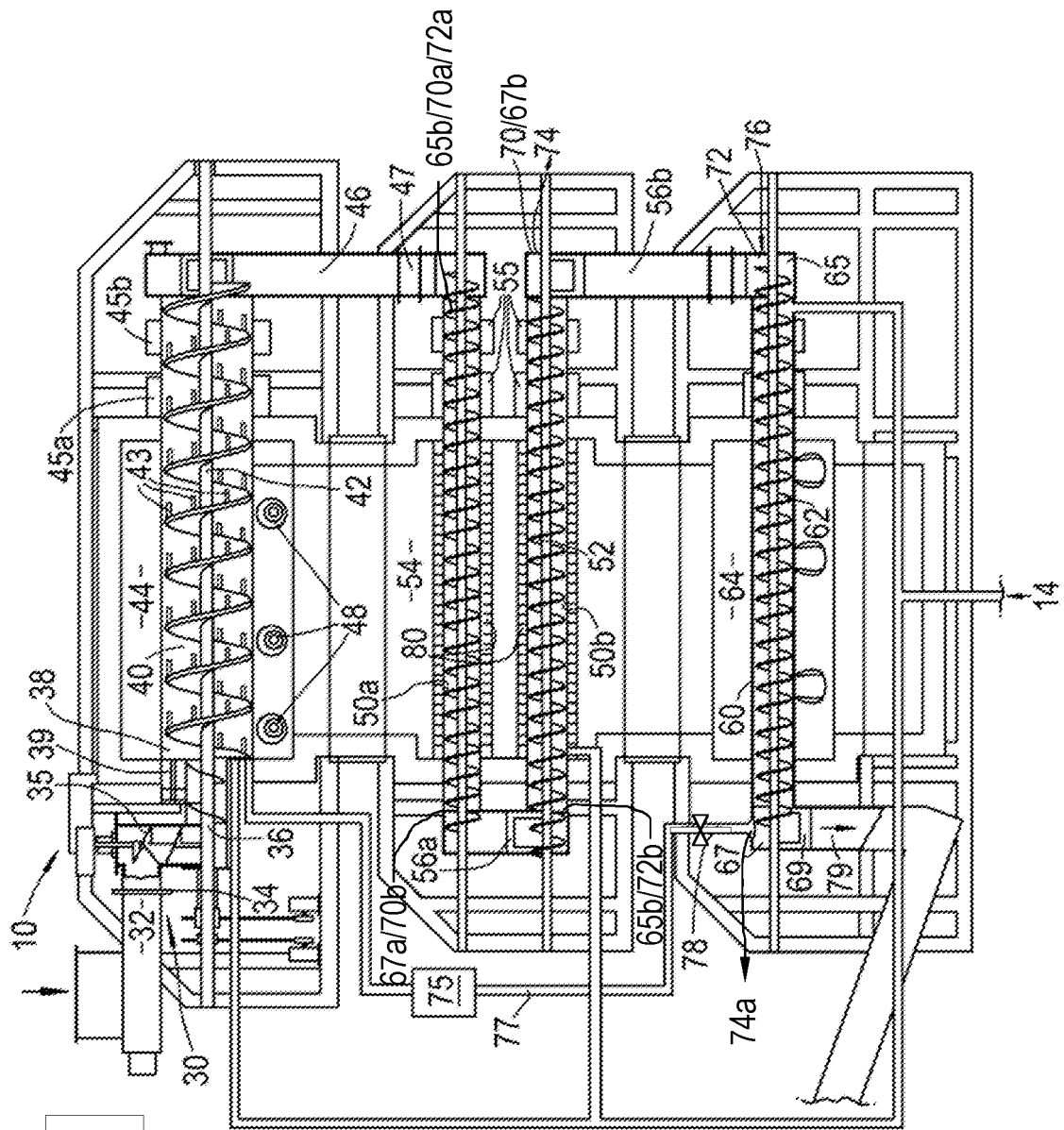
FIG. 4 depicts a another gasification system according to the present disclosure.

As shown in FIG. 4, the secondary and/or tertiary chambers may additionally include injection ports 65, 65a and/or 65b for delivering steam, hydrogen, oxygen, air or any other desired inputs, so to enable gasification of the fixed carbon and residual carbonaceous components that passes through the high temperature pyrolysis stage in the preceding chamber(s); the operation temperature for gasification process within the secondary/tertiary chamber ranges from 700° C. to 1100° C. to cater for a wide range of feedstock.

The gasification chambers, i.e. the secondary and/or tertiary chamber, and pyrolysis chambers may be segregated by a high temperature double dump valve or any other extraction device known to the person skilled in the art, to enable extraction of product gas 74 at an extraction point 70, 70a or 70b prior to gasification stages. This eliminates cross contamination of atmospheric gases within each of the separated chambers while permitting the transfer of solid residue and converted feedstock. In this embodiment the syngas 74a produced within the gasification chamber(s) comprises tar, hydrogen and carbon monoxide. With feed pipe 77 isolated, the syngas 74a may be extracted and diverted from extraction port 67, 67a or 67b and combine with the product gas 74 for downstream gas conditioning and processing. Alternatively the syngas 74a and product gas 74 may be separately conditioned and processed before combined together, or the syngas 74a may be extracted and conditioned independently from the product gas 74 for further usage. Furthermore, the tars, 76, may be introduced at the entrance of the primary chamber 38, secondary chamber(s) 72a or 72b, or tertiary chamber 72 for further pyrolysing/gasifying and cracking.

Systems and processes designed as above allow the user to create optimal conditions for pyrolysing or gasification based on the chemical reactions occurring within the reaction chambers. Thermal Tar cracking refers to the breakdown of large organic compounds into smaller organic compounds, carbon and hydrogen in the absence of oxygen. The thermal cracking of tars results in an increased pool of hydrogen and carbon by which methane can be formed and tars with methyl groups can often crack to form methane directly. An accepted mechanism for the cracking of tars is a chain reaction with radical formation as the initiation step (also the limiting factor for the rate of reaction) and includes a termination step that can involve the formation of methane.

The greater the temperature the greater the rate of radical formation. Above 850° C. (and preferably above 950° C.) the breakdown of primary, secondary and tertiary tars into tertiary tar, carbon, hydrogen and smaller hydrocarbons is efficient. At this temperature Tertiary tar can also partially breakdown to form fixed carbon and smaller hydrocarbons. Although many primary and secondary tars often 'crack' and form large, more refractory tars in these conditions, this still results in a net release of hydrogen, which is required for methanation.

As a result a high temperature is required initially in the pyrolysis process in order to minimise the concentration of problematic tars in the product gas, however temperatures exceeding 1100° C. will begin to pyrolyse methane and as such are not desired.

Most tar cracking occurs in the gas phase, therefore an increased gas residence time and a maximised contact with a catalyst is important for efficient thermal cracking. Nickel based catalysts are well known to aid in tar cracking, and it is also reported that char (carbon) can aid thermal cracking of tar by acting as a suitable substrate, so gas-char contact area should also be maximised.

It is possible to introduce reactants into the chambers to aid tar cracking. Adding steam to create steam gasification is well reported to increase the rate of cracking such that lower temperatures are required to convert tars. The addition of $CO_2$ has similar effects.

However this can have a knock on effect for the methane content of the gas through other reactions in the chambers.

Hydrogen is another possible gaseous reactant that can be introduced to enable hydrogasification. The addition of hydrogen depresses the rate of tar decomposition but aids in the production of methane, it is also likely to help with other gas phase methanation reactions, and so could be a more desirable addition than steam. The hydrogen reacts with radicals to form a stable tar molecule and a hydrogen radical, causing larger concentrations of stable AHs/PAHs such as naphthalene and benzene.

Methanation via the reverse of the steam reformation reaction and the Sabatier reaction forms part of a set of reactions that take place in the conditions of the reactor chambers;

Reverse Steam Reformation:

$$CO_{(g)} + 3H_{2(g)} \leftrightarrow CH_{4(g)} + H_2O_{(g)}$$

$$\Delta H \approx -206 \text{ kj/mol} \qquad 1.$$

Water-Gas Reaction:

$$C_{(s)} + H_2O_{(g)} \leftrightarrow CO_{(g)} + H_{2(g)}$$

$$\Delta H \approx +131 \text{kj/mol} \qquad 2.$$

Sabatier Reaction:

$$CO_{2(g)} + 4H_{2(g)} \leftrightarrow CH_{4(g)} + 2H_2O_{(g)}$$

$$\Delta H \approx -114 \text{ kj/mol} \qquad 3.$$

Boudouard Reaction:

$$C_{(s)} + CO_{2(g)} \leftrightarrow 2CO_{(g)}$$

$$\Delta H \approx +172 \text{ kj/mol} \qquad 4.$$

Methanation Reaction:

$$C_{(s)} + 2H_{2(g)} \leftrightarrow CH_{4(g)}$$

$$\Delta H \approx -75 \text{ kj/mol} \qquad 5.$$

Preferably, the conditions within the reaction chambers are selected and controlled such that reaction 1 is of primary importance. This occurs when carbon monoxide concentration is greater than carbon dioxide concentration due to the inert atmosphere during pyrolysis (hence reaction 3 is less important, even with reaction 4 considered). Additionally reaction 5 is less significant in the operating pressure of the reactor. Optimisation of reaction conditions is based on these considerations and takes into account the fact that creation of methane from carbon monoxide is one incarnation of the Fischer-Tropsch process, which is the creation of hydrocarbons from carbon monoxide and hydrogen:

$$(2n+1)H_2 + nCO \rightarrow C_nH_{2n+2} + nH_2O \qquad 6.$$

In this reaction higher temperatures increase rates of reaction and favour methane formation over longer hydrocarbons. Additionally the use of a catalyst with a high hydrogenolysis activity, such as a Nickel based catalyst, will result in a preference for methane formation. Furthermore, having a high $H_2$:CO ratio will enhance methane formation.

The reaction of carbon with steam (reaction 2) forms more hydrogen that is available for conversion into methane, additionally this lowers the concentration of steam, thus shifting reaction 1 towards the production of steam (and methane) as per Le Chatelier's principle. (Although the reactions in the reactant chamber cannot be assumed to have reached a state of equilibrium, due to the introduction of feedstock that may not be chemically homogeneous, the draw of product gas away from the chambers and the complexity of the reactions occurring at the same time, it is reasonable to assume that the reactions will be constantly acting towards an equilibrium point. Thus it is possible to optimise conditions within the chamber in order to maximise methane production.)

Optimisation of reaction conditions therefore takes place by utilising Le Chatelier's principle in conjunction with the formation of methane through the Fischer-Tropsch process the optimum conditions for the reaction can be evaluated.

Higher temperatures result in a greater tendency for forming methane over longer hydrocarbons in the Fischer-Tropsch process and greatly increase rates of reaction. However, due to the exothermic nature of this type of methanation, higher temperatures also cause a shift away from methane formation towards hydrogen formation in reaction 1 and 3. This is slightly balanced by reaction 2 which is strongly endothermic, and thus an increase in temperature results in a greater yield of hydrogen and carbon monoxide in reaction 2, thus having a knock on effect for reaction 1. Therefore temperatures have to be carefully balanced to maximise methanation.

With the presence of a Nickel based catalyst, at residence times achieved in the process it has been evaluated that a temperature of 700-900° C. is optimal for the methanation of gases in this system. This temperature will also help to crack tars, although it is not as efficient in this process as temperatures of >950° C.

The gaseous reactants within the chamber must also be managed. By decreasing moisture content of feedstock, the concentration of steam is reduced and reactions 1 and 3 shift towards the creation of methane. Additionally, a large steam content will change the types of reaction occurring in the chamber from pyrolysis to steam gasification. However, completely removing all moisture content from the feedstock is not desired as it is a source of hydrogen and carbon monoxide through reaction 2 and an abundant hydrogen and carbon monoxide concentration will result in a greater methane yield. Steam additionally enhances the efficiency of tar cracking as it also gasifies the tars.

The hydrogen concentration can be increased via the cracking of tars and through addition of hydrogen gas into the chamber. Although the addition of hydrogen will decrease the efficiency of tar cracking, it will enhance methane formation through reaction 1, 3 and 5 and it is also important to have as high as possible $H_2$:CO ratio as this will create a further preference for the formation of methane over larger hydrocarbons. Therefore the ability to add hydrogen into the chamber is important, and should be studied to balance between the increased methane yield and the decreased tar cracking efficiency to obtain the most desirable gas content in relation to downstream processes.

It is necessary to create an inert or oxygen free atmosphere by reducing atmospheric gases being introduced to the reactor chambers as any oxygen will readily react with methane to form carbon dioxide and carbon monoxide. Additionally any introduction of nitrogen into the chambers will dilute the gas quality and provide a nitrogen source by which hydrogen and hydrocarbons can react to form undesirable gaseous products.

The yield of methane (and additionally the cracking of tars) can be maximised further by increasing gaseous and solid residence times within the reactor chambers. By increasing the solid residence times the ability to transfer heat to the feedstock is greatly enhanced, thus maximising the percentage of feedstock that is pyrolysed. Creating turbulence in the chamber, by the reintroduction of hot gas, also enhances heat transfer by increasing the effect of convection.

The solid and gas residence times are important to allow the reactions to move towards dynamic equilibrium as conditions within the chamber have been chosen to allow for a maximum methane yield. Additionally the increase in gas residence time will allow more time for surface-catalyst contact, and thus maximising the Fischer-Tropsch methane production and enhance the cracking of tars.

Increasing the contact of char to gases will result in the increase of carbon available for reactions 2 and 5. This is also important for tar cracking, as carbon is reported to aid thermal tar cracking. The circulation of char and feedstock will enhance this effect and also enhance the heat transfer characteristics of the chamber, hence it is an important factor in the maximisation of gas quality.

Nickel based catalysts have a very high hydrogenolysis activity and therefore tend to form methane over longer hydrocarbons in the Fischer-Tropsch process. This is because hydrogen readily adsorbs onto the surface of the catalyst thus increasing the rate of hydrogenolysis. Nickel based catalysts additionally have an effect on the cracking of tars, allowing smaller energies for radical formation and thus enhancing the chain reaction. The requirement for a catalyst with a resistance to corrosion, structural proficiency and an ability to withstand the temperatures in the reactor module led to the choice of Inconel 617 or Nickel Alloy 230.

The surface area contact of this catalyst with the pyrolysis gases must be maximised to ensure efficient cracking of tars and also methanation, additionally the residence time associated with the catalyst-gas contact must be maximised. Furthermore low temperature operation of Nickel catalysts increases the likelihood of sulphur poisoning, hence the high operating temperatures in the chamber help to protect against chemical deactivation of the catalyst.

In some circumstances it may be desirable to increase the equivalence ratio above 0 in order to create gasification conditions. This will decrease the methane content of the resulting syngas but increase the conversion ratio of the feedstock, and in this application it is only desirable should the feedstock have a high fixed carbon content.

Reactions 1 through 5 are all relevant in gasification conditions, however reaction 2 is often the most active in the conversion of fixed carbon and reaction 1 tends towards hydrogen formation, especially in steam gasification. The additional shift conversion reaction is also important in gasification conditions:

$$CO_{(g)}+H_2O_{(g)} \leftrightarrow CO_{2(g)}+H_{2(g)}$$

$$\Delta H \approx +41 \text{ kj/mol} \qquad 7.$$

This reaction tends to increase the amount of hydrogen in the syngas at the expense of carbon monoxide, however as this reaction is mildly exothermic higher temperatures result in a shift towards more carbon monoxide formation than at lower temperatures.

The exact constituents of the syngas upon exiting a gasification reactor will be highly dependent on the gasification agent but will comprise large portions of hydrogen, carbon monoxide and carbon dioxide and a small percentage of hydrocarbons. This is because the reactants introduced to create gasification conditions will usually push the reactions 1 through 5 away from methane formation. Gasification agents can include but are not limited to hydrogen, oxygen, steam, carbon dioxide and air. In this embodiment steam gasification has been identified due to the accessibility and low cost of steam combined with the tar cracking effects. The addition of steam also encourages hydrogen formation over carbon monoxide formation through reaction 7, which is usually desirable.

As with pyrolysis, the higher the temperature during gasification the lower the yield of tars and, as the methane content is usually already low, less consideration can be attributed to maximise methane formation. Hence the primary function of temperature is to reduce tar content of the syngas and increase conversion of feedstock. Additionally the residence times within a gasification process should be balanced in order to achieve maximum conversion of the feedstock.

Examples

Following is a detailed example of a gasification system and process and components thereof according to the present disclosure. The example relates to a modular system and process for converting a mass of prepared carbonaceous feedstock into consistent high methane content product gas by way of high temperature pyrolysis.

As a variant, the modular system and process may additionally involve a syngas produced via a temperature controlled gasification process of the fixed carbon and residual carbonaceous components.

In discussing the examples the following definitions have been used.

Reactor Chambers

Controlled inert environment to enable pyrolysis of feedstock under thermal treatment conditions. Constructed from high catalytic nickel alloy with integrated feed system and automated carbon residue removal. Capability of chamber environment control via the addition of steam, hydrogen, oxygen, air or any other desired inputs to enable gasification.

Resultant Chambers

Insulated vertical chambers by which the separate reactor chambers are connected. Feedstock is passed out of the reactor chambers via auger screws and is guided to the next via the insulated vertical resultant chambers, fitted with bellows where appropriate to account for thermal expansion.

Reactor Module

The reactor chambers are constructed in a vertically integrated manner consisting of an Inconel 617 or Nickel Alloy 230 primary chamber (1×36" diameter retort), a secondary chamber (2×16" retort) and a tertiary chamber (1×16" retort). This allows for circulation of hot gases and for gravity assisted flow of feedstock, fixed carbon and residual materials Pyrolysis stack thermal/heat requirement is supplied by a 2.8 MW capacity gas burning system. Ceramic lined furnace using exhaust stack control flap to circulate energy. Thermal energy input is applied to the primary chamber of which most is applied to the first half of the retort. The combustion gas is designed to flow via the secondary and tertiary chambers via an exhaust stack suction control flap which monitors flow rate to enable efficient utilisation of energy. An additional 3 burners are positioned around the tertiary chamber to provide further energy input into the process.

Product Gas

'Product gas' refers to the gaseous product retrieved from the reactor chambers that is intended for further downstream use. It may consist of a blend of gasification gaseous emissions and pyrolysis gaseous emissions or solely pyrolysis gaseous emissions. This gas is sealed away from the atmosphere and any other possible gaseous contaminants and is kept at a constant positive pressure throughout the process in order to reduce risk of contamination. The process described is expected to produce product gas of a high methane content (>50% volume) that requires cleaning. This gas is referred to as product gas before and after the downstream separation unit and may be recycled into the chambers, combusted in an engine, combusted in burners within the process or used in other processes. The term "reaction gas" is used in the appended claims to specifically refer to the gas produced in the pyrolysing and methanating steps.

Syngas

'Syngas' refers to gaseous emission solely from gasification chambers when a reactant, or gasification agent, is introduced therein. The exact constituents of the syngas depend highly on the reactant but will comprise large portions of hydrogen, carbon monoxide and carbon dioxide and a small percentage of hydrocarbons. The reactants can include but are not limited to hydrogen, oxygen, steam, carbon dioxide and air. Due to the accessibility and low cost, as well as the associated tar cracking effects, steam may be used as the reactant in some embodiments. The addition of steam also encourages hydrogen formation over carbon monoxide formation. The syngas can be blended with product gas or isolated from the product gases and extracted for further uses. Typically this has a much lower methane content than product gas and high carbon monoxide and hydrogen levels.

Combustion Gas

'Combustion gas' refers to the exhaust gas from burners inside the reactor module that is circulated around the outside of the reactor chambers in a combustion void in order to heat the chambers to the desired temperatures. At no point does this gas mix with product gas, and it is extracted via an exhaust flap after passing through the thermal oxidiser.

Feedstock

The feedstock can be any fuel used for pyrolysis in the reactor chambers. This typically refers to refuse derived fuel (RDF) but may also refer to any combination of municipal solid waste (MSW), wood chips, specified recovered fuel (SRF), tyre chippings, coal or waste coal.

Waste Coal

A carbonaceous feedstock with a relatively large fixed carbon content. Waste coal typically consists of very small particles ranging from microns to 5 mm. Waste coal can be extracted from slag by known methods of separation such as cyclones whereby a portion of the larger sized particles, typically agglomerated by contaminants will be further processed for environmental treatment such as enzyme treatment. The coal particles from the slag, relatively free of contaminants, is then suitable as a waste coal feedstock.

Tars—Primary, Secondary and Tertiary

The term 'Tars' is a very broad term, widely recognised as meaning the organic products, usually aromatics, produced from thermal treatment of organic feedstock that do not include solid carbonaceous material or typical gaseous constituents (methane, hydrogen, carbon monoxide, carbon dioxide) and condenses under operating conditions. Many in the literature split tars into three different compartments; primary, secondary and tertiary tars.

Primary tars is generally characterised by compounds derived directly from the thermal treatment (pyrolysis in this case) of organic feedstock, for example levoglucosan, hydroxyacetaldehyde, furfurals and methoxyphenols. Secondary tar is generally characterised by phenols and olefins. Tertiary tar is characterised by aromatic compounds without oxygen constituents which may be alkalised (for example, toluene or indene) or 'condensed' products such as polyaromatic hydrocarbons or aromatic hydrocarbons without substituents (e.g. benzene, naphthalene, acenaphthylene, phenanthrene, anthracene).

Stage 1: Feedstock Preparation

In the example system and process, preparation of the feedstock utilises equipment designed to remove all metal and bulky items and to shred the residual material to a consistent particle size of approximately 30 mm diameter. Calculations of the thermal characteristics of the feedstock in accordance with the feedstock flow rate per hour required in the process, the mechanical operation of the reactor chamber and the chamber temperatures have found that this is the optimal particle size to allow efficient heat penetration within the pyrolysis primary chamber. The homogeneity of the feedstock avoids any process disruptions and the shredding additionally liberates metallic components and other large (≥30 mm) inert materials from the feedstock, thus reducing energy consumption from inert material.

The 30 mm particles are processed through a thermally controlled dryer to allow the moisture content to be controlled to a level of ≤5%. A moisture content of ≤5% is preferred to control the inert atmosphere and oxygen levels for efficient gas conversion and to provide a suitable gas composition within the chamber. Excessive levels of moisture will result in the release of steam which will affect the chemical reactions within the chamber.

The dryer has been designed to be powered by gas burners (fuelled by natural gas, product gas or syngas) or an integrated heat exchanger to be fed by waste heat from the system. An integrated moisture control system is included to adjust flow rate and moisture levels accordingly with system requirements.

An intermediate system feed hopper is positioned to supply the reactor chambers with a continuous feedstock should front end down time be required.

From the intermediate hopper the feedstock is conveyed to a pyrolysis stack feed throat mechanism using a cantilever auger screw compression device, thus creating an airlock. The airlock is designed to employ the feedstock as a compression plug. The result of this is to utilise extraction by compression of the feedstock to remove atmospheric gases which could contaminate the pyrolysis chamber. Any atmospheric gases contaminating the product gas will result in a lower product gas quality by both contaminating and diluting the product gas. The introduction of oxygen will result in unwanted oxidation of carbonaceous materials, thereby increasing carbon monoxide and carbon dioxide levels and reducing methane concentration in the product gases. The introduction of nitrogen will dilute the calorific value of the product gas by diluting it with inert nitrogen.

A pressure hydraulic control flap then releases feedstock into a vertical feed throat and from there into a high speed feed auger screw. The hydraulic flap is calibrated in accordance with feedstock flow rate, bulk density and heat transfer properties to feed the primary chamber with appropriate feed flow for optimal gas conversion. It has been established that a high feed flow rate into the reactor will help to overcome the problem of solidification of the feedstock prior to entry into the chamber due to melting or solidification of the material.

The overall reactor design of the example allows for both the efficient circulation of hot gases between the different reactor chambers and also for the gravity assisted movement and flow control of feedstock and residual products. The net result is a vertical reactor tower.

The reactor module vertical chambers are all interconnected via horizontal ducts designed to utilise maximum input energy supplied by six gas powered burners to the primary chamber by means of vertical circulation of combustion gases with circulation pressure controlled by a downstream induced draft fan. The positions of the six primary chamber gas burners are optimised to ensure a thermal vortex is formed around the retort barrel, thus eliminating potential hotspots.

Each of the combustion reactor chambers comprises combustion voids designed to allow equal distribution and circulation of combustion gases and are independently insulated by ceramic fibre walls. The exhaust port connecting the primary chamber to the secondary combustion gas chamber has sufficient cross sectional area to aid the flow of hot combustion gases from the primary to the secondary chambers and secondary to tertiary chamber.

The burners can be powered by product gas (currently calculated at 10% of product gas yield for this system) to allow self-sufficiency of the process or an external supply of propane or towns gas (a fuel gas commonly supplied domestically). Most of the required thermal energy for conversion is supplied within the first half of the primary chamber. The burners have been positioned to supply the required energy in accordance with flow rate of feedstock.

Temperature measuring devices are inserted at various positions within the chamber to ensure chamber temperature is kept at a constant value. In the instance of 30 mm RDF feedstock, or coal powder from slags typically having a particle size of less than 5 mm, a constant temperature between 850-1100° C., preferably 950-1100° C. (for example 1050° C.) is required throughout the primary chamber to carry out optimum pyrolysis conversion of feedstock. A dense cast ceramic refractory end cap is applied to the input of the primary chamber; this acts as a containment barrier to prevent heat transfer from the reactor chamber to the feedstock in the feed throat system.

The combustion gas generated around the primary chamber is drawn and circulated around two secondary chambers. This is to modulate a consistent temperature of between 700-900° C. (for example 850° C.) within the secondary chambers that comprise fins attached to the retort in order to increase absorption of the thermal energy. The hot gas is further circulated to the tertiary chamber which has additional top up burners to give a consistent temperature range between 700-1100° C. in both pyrolysis and gasification operation and may comprise additional cooling mechanisms such as i.d. fans to provide temperature control under gasification operation due to the exothermic nature of the process within the chamber.

The modular dimensions of all the chambers are selected in accordance with throughput requirement, residence time requirements of both feedstock and gases and total surface contact area requirements of the catalyst with the feedstock and gases. It is advantageous to utilise the catalytic effect of the material used in the construction of the reactor (Inconel 617 or Nickel Alloy 230) which has been specially selected for its thermal and catalytic properties.

Primary Chamber Specification/Operation

For the flow rate of feedstock of 2500 kg/hr the dimensions of the primary chamber are selected in accordance with the required pyrolysis conversion temperature of 850-1100° C., preferably 950-1100° C. It consists of an Inconel 617 or Nickel Alloy 230 36" diameter retort barrel, 12 feet long with 9 mm wall thickness. Within the chamber is housed an auger screw provided with the correct fighting and pitch for efficient conveying of feedstock and residue flow rate. The flighting has been designed with gas flow ports and also a 17 mm clearance to the retort barrel. Brushes clean the inside of the retort barrel of any residue build that could deactivate the catalyst.

The selected feedstock flow rate covers approximately 25% of the surface area of the inner retort barrel on entry. The thickness of the feedstock layer is 28 mm. As pyrolysis conversion takes place carbon is formed; this can form an insulating layer that prevents efficient heat transfer to unconverted feedstock. To prevent this, circulation and agitating paddles are provided in accordance with chamber size and feedstock throughput. These paddles are positioned on the leading edge of the flighting to circulate the feedstock efficiently within the chamber in order to reduce the thickness of the insulating layer of char (thus increasing the conduction effect of heat transfer from the surface of the retort to unconverted feedstock), circulate unconverted feedstock throughout the chamber (increasing solid-gas heat transfer) and increase the catalyst-gas contact surface area.

In addition to the introduction of the paddles, reintroduction of hot, pressurised product gas and tertiary chamber gases at the entrance of the chamber increases gas turbulence which increases heat transfer by convection from the hot gas within the chamber to the solid feedstock. This additionally forms part of the closed loop pressurised system. The combined effect of the circulation paddles and product gas recirculation greatly enhances the pyrolysis conversion rate by maximising heat transfer in the resident time within the chamber.

The primary chamber, held at a constant temperature between 850-1100° C., preferably 950-1100° C. (for example 1050° C.) primarily pyrolyses the majority of the feedstock within the residence time controlled by the rpm of the auger screw, with the additional modifications as detailed above. At the temperature and residence time of the resultant product gas, the primary chamber will also crack primary and secondary tars formed in the pyrolysis process. Partial cracking of tertiary tar and partial methanation will additionally take place.

The surface area of the catalyst is maximised by complete use of a high Nickel alloy on all contact surfaces available in the reactor including walls and auger screw flights. In addition, specific high surface area alloy brushes are provided to clean the surface walls of any carbon deposit. The thermal properties provided by the Inconel are high temperature resistance and resistance to melt and deformation.

All materials used are selected to possess thermal expansion properties within operational limits and sufficient to allow for elongated processing periods. For instance, the system is designed to compensate for the thermal expansion of the auger screw and primary retort chamber. These are rigidly fixed at the feedstock input end so that horizontal thermal expansion only takes place in one direction. The auger screw is supported and the expansion taken up by slip through bearings and the retort barrel expansion, both horizontally and radially are compensated for by a double contraction/expansion bellows system. The bellows system also provides gas tight seals for both blockage of entry of combustion gas from the heating chamber and escape of product gas from the inert pyrolysis chamber. The bellows are manufactured from stainless steel 316 or similar and have a calculated thermal ceramic insulation in order to maintain the same amount of thermal expansion as the nickel alloy retort barrel at operating temperature.

Upon leaving the pyrolysis chamber the residual materials, unconverted feedstock and product gases are transported into a resultant chamber constructed and insulated to contain the required temperatures and minimise thermal energy loss from both the residual materials and product gas. These are fitted with additional bellows to compensate for thermal expansion.

Secondary Chamber Specification/Operation

For the flow rate of feedstock of 2500 kg/hr (including calculations for the reduction in volume due to pyrolysis conversion) the dimensions of the secondary chambers are selected in accordance with the preferred temperature range of 700-900° C. (for example 850° C.) to maximise gas methanation. The secondary chambers consist of two Inconel 617 or Nickel Alloy 230 16" diameter retort barrel, 12 feet long with 9 mm wall thickness, positioned in a vertical formation. The chambers have fins around the outside edge in order to assist with heat transfer from the circulating combustion gases. A resultant chamber joins the two pyrolysis chambers to allow gravity assisted flow of residual materials, unconverted feedstock and product gases between the chambers. On exit of the first secondary chamber, residual materials, product gases and unconverted feedstock pass through a resultant chamber and are fed into the second of the two secondary chambers (an identical copy of the first). On exit of the second of the two secondary chambers the residual materials, product gases and unconverted feedstock pass into a resultant chamber prior to entry into the tertiary chamber.

The secondary chambers provide an extended residence time for further pyrolysis of any unconverted feedstock and enables additional resident time for gas produced within the primary chamber and additional gas-catalyst contact surface area, all of which further encourages methanation and tar cracking. The temperature range of 700-900° C. allows for a more efficient methanation of the product gas than that achieved between 850-1100° C. It has been found, based on the chemical and thermal requirements of the conditioning of the gas in conjunction with the catalyst surface area and gas residence time that two secondary chambers with decreased pitch between auger screw flightings as compared to the primary chamber are preferred at the aforementioned dimensions to meet the desired gas quality.

As per the primary chamber a double contraction/expansion bellows system is applied to the secondary chambers to compensate for horizontal and radial thermal expansion, calibrated such that the expansion rate equals that of the primary chamber, thus enabling to the resultant chambers to remain at right angles to the reactor chambers at all times.

Secondary Chambers Under Gasification Operation:

Under gasification operation, all remaining residue materials that exit the pyrolysis chambers through the high temperature double dump valve are introduced into the secondary chamber via a high speed auger screw. On entry to the secondary chamber the residue is combined with the injection of processed tars removed from the product gas in the downstream separation unit. A further injection of steam, hydrogen, oxygen, air or any other desired inputs is introduced in order to gasify the residual materials from the primary and/or initial secondary pyrolysis chambers and the tars reintroduced from the downstream separation unit. These are conveyed through the chamber at a calculated speed to give the optimum residence time for complete gasification.

The system has been designed with flexibility with the type of reagent introduced. A combination of any of steam, hydrogen, oxygen, air or any other desired inputs can be introduced via a gas injection port. This allows for the optimisation of gas quality, the minimisation of the volume of residue materials evacuated and the maximisation of tar cracking in the tertiary chamber.

An additional gas take off port is installed to remove syngas production under gasification operation.

Secondary to Tertiary Resultant Chamber

The resultant chamber connected to the exit of the second of the two secondary reactor chambers has been designed to incorporate a gas take off valve/port such that under closed loop positive pressure conditions all product gas produced from the pyrolysis conversion passes from the reactor module to the downstream separation unit. All remaining solid material, with the assistance of gravity passes through a resultant chamber with built in expansion bellows into a high temperature ceramic double dump valve. The valve is designed in accordance with the residual material flow rate to extract from the closed loop pressurised pyrolysis inert atmosphere without contamination from the tertiary chamber. This resultant chamber is sufficiently insulated to minimise energy loss from the residual materials and gases.

Tertiary Chamber Specification/Operation

For the flow rate of feedstock of 2500 kg/hr (accounting for the reduction in volume due to pyrolysis conversion) the tertiary chamber has been designed with dimensions calibrated in accordance with the required temperature range of 700-1100° C. to optimise all of the following; gas methanation, cracking of tars and further pyrolysis of all remaining residue material from the previous primary and secondary pyrolysis chambers. The tertiary chamber consists of an Inconel 617 or Nickel Alloy 230 16" diameter retort barrel, 12 feet long with 9 mm wall thickness. The chamber incorporates an additional inlet port for the reintroduction of tars that have been removed from the product gas stream in the downstream separation unit.

The chamber has the capability to also operate as a gasification unit with the controlled introduction of steam, hydrogen, oxygen, air or any other desired inputs independently to the above pyrolysis reactor chambers.

The tertiary chamber design, similar to the primary chamber, houses three independently controlled gas burners to apply the required thermal energy to the chamber retort. The angles and positioning of the burners and combustion void are designed to ensure combustion gases are directed to create an equal energy distribution via a gas vortex around the external surface of the tertiary chamber retort barrel. This eliminates the possibility of thermal hotspots. The tertiary chamber has a direct product gas feed pipe link back to the main primary chamber; this also contains a sintered nickel filter/catalyst to allow further methanation. The tertiary chamber also houses a high temperature double dump valve to remove any residue and inert matter that has not converted in the chamber.

The tertiary combustion chamber incorporates the exhaust manifold and evacuation chamber for the reactor chamber system combustion gases. This houses an additional product gas feed pipe which may be connected directly to the entrance of any of the primary, secondary and tertiary chambers to allow preheating of product gas prior to introduction to the chambers. This has an independent flow control flap downstream which monitors and controls combustion gas flow rates in conjunction with all chamber temperatures by utilising an internal temperature monitoring system.

Under pyrolysis operation, all remaining residue materials that exit the primary and secondary pyrolysis chambers through the high temperature double dump valve are introduced into the tertiary chamber via a high speed auger screw. On entry to the main tertiary chamber the residue is combined with the injection of processed tars/gas removed from the product gas stream in the downstream separation unit. These are conveyed through the chamber at the desired temperature to maximise tar cracking and pyrolysis conversion of any unconverted feedstock that may still be present within the flow. The tertiary chamber exit point incorporates a gas take off and a further high temperature double dump valve. All gas produced is recirculated back to the input of the primary chamber via a sintered nickel filter.

This assists with further methanation and removes any particulates within the gas flow. Any solid material that remain (inert, fixed carbon and any other solid materials) are evacuated via the high temperature double dump valve for further processing.

Tertiary Chamber Under Gasification Operation:

Under gasification operation, all remaining residue materials that exit the primary and secondary pyrolysis chambers through the high temperature double dump valve are introduced into the tertiary chamber via a high speed auger screw. On entry to the tertiary chamber the residue is combined with the injection of processed tars removed from the product gas in the downstream separation unit. A further injection of steam, hydrogen, oxygen, air or any other desired inputs is introduced in order to gasify the residual materials from the primary and secondary pyrolysis chambers and the tars reintroduced from the downstream separation unit. These are conveyed through the chamber at a calculated speed to give the optimum residence time for complete gasification.

The system has been designed with flexibility with the type of reagent introduced. A combination of any of steam, hydrogen, oxygen, air or any other desired inputs can be introduced via a gas injection port. This will allow for the optimisation of gas quality, the minimisation of the volume of residue materials evacuated and the maximisation of tar cracking in the tertiary chamber.

An additional gas take off port is installed to remove syngas production under gasification operation.

The product gas is stored and removed as necessary for combustion through a gas engine, for gas burners in the reactor, for pressure control via a closed loop pressure system, for burners in the drying system or for other end uses.

Alternative Design Featuring Annulus Under Counter Flow Operation

In addition to the configurations previously described, the required thermal process can be realised with an alternative design, in which use is made of counter flow flue gas delivery in the design and configuration of the plurality of burners required to deliver the thermal energy to the chambers via an annulus 106 with walls comprising refractory material. An example of such an arrangement is depicted in FIGS. 5a and 5b.

In embodiments where counter flow flue gas delivery is desired, the plurality of burners would be located within a burner box 100 and equally spaced to ensure a uniform flow of flue gases. The burner box 100 would be positioned vertically below the secondary chamber 60 and/or tertiary chamber 50 and the flue gas would be directed at a calculated angle of delivery to ensure uniform flow of flue gases over each chamber sequentially from secondary 50 to primary 40 or tertiary 60 to secondary 50 to primary 40. Each chamber has predimensioned fins 80 vertically aligned parallel to the flue gas flow to ensure uniform flow over each chamber and to maximise heat transfer. The cross-sectional area in between each fin along the axis of each chamber is calculated to ensure uniform flow and a specific desired velocity. Flow is controlled as per other embodiments previously described as a further enhancement to achieve the required heat transfer to each of the chambers. Upon exhausting from the annulus 106 at point 102 the flues can, if desired, be recirculated into the burner box 100 or nominally after the burner box at point 104, to reduce the required combustion gas consumption.

Thus, when the system is designed for counter-flow operation the setup of the vertical chambers does not change when compared to similar embodiments as previously described. The major differences between embodiments utilising counter-flow operation and those which do not involve the annulus cross-sectional area, the fin design, the exhaust of flue gases and the position of the burners and hence the flow of flue gas. Under counter-flow operation, the burners are positioned vertically beneath the pyrolysis and gasification chambers, and the flue gases are circulated from the tertiary chamber 60 or the lower secondary chamber 50 vertically upwards to the primary chamber before exiting and/or recirculating.

In the embodiment depicted in FIGS. 5a and 5b, the fins 80 and annulus cross-sectional area are designed in accordance with a uniform flow of flue gases along each chamber axis and a constant velocity of nominally 15 m/s. The fin dimensions are further optimised to maximise heat transfer between the flue gases and the chambers. Burners are positioned in a separate burner box 100 attached to the tertiary chamber 60 and positioned in such a way as to ensure that the flow is axially uniform. A further inlet port 104 for recirculated flue gas or heated air prior to the lowest chamber 60 but subsequent to the burner box 100 is included which allows, if desired, for heated gases to be mixed with combusted gas to reduce the requirement of combustion gases.

With use of this design embodiment and tertiary 60 and/or secondary chambers 50 under gasification conditions the gasification reactant would be selected to ensure that exothermic gasification reactions do not raise the temperature of the chambers above desired temperatures (for example, using steam as the gasification reactant, as the type of gasification involving steam is primarily exothermic).

Preferable Operating Conditions

At suitable operating temperatures as disclosed above, with appropriate selection of the modular dimensions of the chambers, appropriate pressures, gaseous residence times, and solid feedstock residence times in the chambers are obtained. For instance, in the system it is preferable to exert a slight positive pressure (0<pressure<1.5 bar gauge), and at appropriate temperatures and operating conditions the gaseous residence time in the pyrolysis system (the primary chamber and the secondary chamber, if it is being used as a pyrolysis chamber) is 1-4 seconds (the lower the temperature distribution over the pyrolysis system, the longer the residence time) and solid residence time in the pyrolysis system will be >2 minutes.

Features List

The following features, singly and in any combination with each other, are suitable for use with the invention presently claimed, and may independently or in combination provide inventions additional to or distinct from the invention presently claimed.

1. A process for converting a carbonaceous feedstock into a product gas, comprising the step of:
    i) Pyrolysing and methanating the feedstock to produce a gas in at least one reaction chamber, wherein the at least one reaction chamber comprises at least one inlet and at least one outlet.
2. The process of feature 1, further comprising the step of:
    ii) Removing the gas from the outlet of the at least one reaction chamber.
3. The process of feature 2, further comprising the step of:
    iii) recirculating a portion of the removed product gas into the inlet of the at least one reaction chamber for further processing
    optionally further comprising the step of:
    iv) recovering a portion of the removed gas to form the product gas.
4. The process as featured in any preceding feature, wherein the product gas comprises methane and long chain hydrocarbon having a carbon number of at least two;
    optionally, the long chain hydrocarbon may comprise tar.
5. The process as featured in feature 4, further comprising a step of separating the gas into product gas and a recirculated portion; wherein the product gas comprises a substantially higher methane content than the gas; and wherein the recirculated portion comprises a subsatantially higher tar content than the gas.
6. The process as featured in feature 5, further comprising a step of recirculating the recirculated portion into the at least one inlet of the reaction chamber.
7. The process as featured in any of the preceding features, further comprising a step of conditioning the feedstock prior to pyrolysis.
8. The process as featured in feature 7, wherein said conditioning step comprises any of sorting, filtering, shredding and drying of feedstock in a feed preparation system.
9. The process as featured in feature 8, wherein the drying process is accomplished by a thermally controlled dryer.
10. The process as featured in feature 9, wherein the thermally controlled dryer comprises any of gas burners, integrated heat exchangers, or an integrated moisture control system.
11. A system for carrying out the process as featured in any of the preceding features.
12. A system as featured in feature 11, wherein the at least one reaction chamber comprises a primary chamber, optionally comprising a double contraction/expansion bellows system.

13. A system as featured in feature 12, wherein the at least one reaction chamber further comprises a secondary chamber serially connected to the primary chamber, the walls of the secondary chamber optionally comprising fins, the secondary chamber optionally comprising a double contraction/expansion bellows system.
14. A system as featured in feature 13, wherein the at least one reaction chamber further comprises a tertiary chamber serially connected to the secondary chamber, the walls of the tertiary chamber optionally comprising fins, the tertiary chamber optionally comprising any of an inlet port for reintroduction of tars or injection ports for controlled introduction of steam, hydrogen, oxygen, or air.
15. A system as featured in any of features 12-14, wherein the primary chamber comprises at least one barrel.
16. A system as featured in any of features 13-14, wherein the secondary chamber comprises at least one barrel.
17. A system as featured in feature 14, wherein the tertiary chamber comprises at least one barrel.
18. A system as featured in any of features 13-14 or 16-17, wherein both the primary chamber and secondary chamber comprises at least one barrel.
19. A system as featured in any of features 14 or 17, wherein each of the primary chamber, secondary chamber and tertiary chamber comprises at least one barrel.
20. A system as featured in any of features 15 to 19, wherein at least one barrel comprises an auger for conveying the feedstock and product gas within said barrels.
21. A system as featured in feature 20, wherein each of the barrels comprises an auger for conveying the feedstock and product gas within each respective barrel, the augers optionally comprising screw flightings comprising nickel alloy brushes at their edges, the auger in the primary chamber optionally comprising agitators, the auger in the secondary chamber optionally comprising decreased fighting pitch compared with the auger in the primary chamber.
22. A system as featured in feature 21, wherein the augers in each of the barrels are made of a nickel containing material to facilitate catalytic conversion during the methanation process, wherein optionally the nickel containing material is an austenite nickel-chromium-based superalloy (for example, Inconel 716™)
23. A system as featured in feature 14 or any of features 15-22 as dependent on feature 14, wherein the primary chamber and tertiary chamber operate at a higher temperature than secondary chamber.
24. The system as featured in feature 14 or any of features 15-23 as dependent on feature 14, wherein the primary chamber and tertiary chamber operate at or above 1000° C. to promote the pyrolysis of feedstock and cracking of tar.
25. The system as featured in feature 13 or any of features 15-24 as dependent on feature 13, wherein the secondary chamber operates at substantially 850° C. to promote the methanation of tar.
26. The system as featured in feature 13 or any of features 15-25 as dependent on feature 14, wherein the gas is removed from the outlet of the secondary chamber for separation of gas into product gas and a recirculated portion.
27. The system as featured in feature 26 as dependent on feature 14 or any of features 15-25 as dependent on feature 14, wherein the recirculated portion is reintroduced to the inlet of the tertiary chamber.
28. The system as featured in feature 14 or any of features 15-27 as dependent on feature 14, wherein the gas and tar removed from outlet of the tertiary chamber is reintroduced to the system at the inlet of the primary chamber.
29. The system as featured in any of features 15-19, or any of features 20-28 as dependent on features 15-19, wherein at least one of the barrels comprises a heating jacket, optionally insulated using advanced ceramic fibre.
30. The system as featured in feature 29, wherein each of the barrels comprises a heating jacket, optionally independently insulated using advanced ceramic fiber.
31. The system as featured in feature 29 or 30, wherein said heating jackets are in fluid communication with each other, optionally through exhaust ports installed to connect the heating jackets of the primary chamber to those of the secondary chamber (where a secondary chamber is present) and the heating jackets of the secondary chamber to those of the tertiary chamber (where a tertiary chamber is present).
32. The system as featured in any of features 29-31, wherein the each of the heating jackets comprises a heater, optionally axially positioned.
33. The system as featured in feature 32, wherein the heater is a gas burner utilizing either a portion of the gas or the product gas generated by the process or an external natural gas supply.
34. The system as featured in any of features 29-33, further comprising shock absorbing mechanisms at connections between the heating jacks and barrels.
35. The system as featured in any of features 15 to 34, wherein each of the chambers extends in a substantially horizontal direction.
36. The system as featured in feature 35, wherein the chambers are vertically stacked to form a tower.
37. The system as featured in feature 13 or any of features 14-36 as dependent on feature 13, further comprising resultant chambers between each of the serially connected chambers to provide buffering capacity.
38. The system as featured in feature 37, further comprising shock absorbing mechanisms at connections between each of the barrels and resultant chambers.
39. The system as featured in any of features 34 or 38, wherein the shock absorbing mechanism is or comprises bellows.
40. The system as featured in feature 12 or any of features 13-39 as dependent on feature 12, further comprising a feeding mechanism for feeding the carbonaceous feedstock from the feed preparation system into the primary chamber.
41. The system of feature 40, wherein said feeding mechanism comprises an auger.
42. The system as featured in feature 40 or 41, wherein the feeding mechanism further comprises a hopper to provide buffering capacity.
43. A feeding mechanism suitable for use in a system according to any of features 11-42.
44. An auger suitable for use in a system according to any of features 11-42.
45. The auger of feature 44, specifically for use in the feeding mechanism of a system according to feature 41 or feature 42 as dependent on feature 41, optionally comprising a pressure hydraulic control flap.
46. The auger of feature 45, wherein the auger is a cantilever auger screw compression device or a high speed feed auger screw.
47. A shock absorbing mechanism for use in a system according to any of features 11-42.

48. The shock absorbing mechanism of feature 45, wherein the shock absorbing mechanism is or comprises bellows.
49. A heater suitable for use in a system according to any of features 11-42.
50. A heating jacket suitable for use in a system according to any of features 11-42.
51. A chamber suitable for use in a system according to any of features 11-42.
52. A feed preparation system suitable for use in a system according to any of features 11-42.
53. A thermally controlled dryer suitable for use in a feed preparation system according to feature 52.
54. A heater suitable for use in a thermally controlled dryer according to feature 53.
55. The heater of feature 54, wherein the heater is a gas burner or an integrated heat exchanger.
56. An integrated moisture control system suitable for use in a thermally controlled dryer according to feature 53.
57. A thermally controlled dryer according to feature 53 comprising any of the features of features 54-56.
58. A system for carrying out the process as featured in any of features 1-10, wherein the system comprises at least one of the features of features 43-57.

Various embodiments and features have been described above. It should be recognized that these embodiments are merely illustrative of the invention presently claimed and may themselves separately or in combination form inventive matter. Numerous modifications and adaptations thereof will be readily apparent to those of skill in the art without departing from the scope of the invention claimed or that may in future be claimed based on this disclosure.

The invention claimed is:

1. A system for converting a carbonaceous feedstock into a reaction gas, wherein the system comprises at least one pyrolysis chamber, a secondary chamber, and a tertiary chamber; wherein the at least one pyrolysis chamber comprises a primary chamber; wherein the primary chamber, the secondary chamber and the tertiary chamber are serially connected and vertically stacked;
   wherein each chamber has its own heating jacket that controls an operating temperature in each respective chamber, wherein the heating jackets are in fluid communication with each other such that heat from one chamber's heating jacket is drawn through one or more heating jackets of other chambers;
   wherein the dimensions of the primary chamber are selected in accordance with the gaseous residence time of 1-4 seconds at a pressure between 0 and 1.5 bar gauge, a solid residence time of more than 2 minutes, and an operating temperature at or above 850° C. to promote the pyrolysis of feedstock.
2. A system as claimed in claim 1, wherein the primary chamber operates at or above 950° C. to promote the pyrolysis of feedstock.
3. A system as claimed in claim 1, further comprising at least one gasification chamber, wherein the at least one gasification chamber comprises the tertiary chamber; wherein either the pyrolysis chamber or the gasification chamber further comprises the secondary chamber; and wherein the modular dimensions of all the chambers are selected in accordance with throughput requirement and residence time requirements of both feedstock and gases.
4. A system as claimed in claim 1, wherein the secondary chamber operates at between 700° C. and 900° C.; and wherein the tertiary chamber operates between 700° C. and 1100° C. to promote the conversion of unconverted feedstock.
5. A system as claimed in claim 4, wherein the secondary chamber comprises an outlet operable to allow removal of reaction gas; and wherein the tertiary chamber comprises an outlet operable to allow removal of reaction gas.
6. A system as claimed in claim 1, wherein the secondary chamber and tertiary chamber operates between 700° C. and 1100° C. to promote the conversion of unconverted feedstock.
7. A system as claimed in claim 6, wherein the primary chamber comprises an outlet operable to allow removal of reaction gas; and wherein the secondary and/or tertiary chamber comprises an outlet operable to allow removal of reaction gas.
8. A system as claimed in claim 1, wherein the primary chamber operates between 850° C. and 1100° C. to promote the pyrolysis of feedstock.
9. A system as claimed in claim 8, wherein the primary chamber operates between 950° C. and 1100° C. to promote the pyrolysis of feedstock.
10. A system as claimed in claim 8, wherein modular dimensions of all the chambers are selected in accordance with throughput requirement and residence time requirements of both feedstock and gases.
11. A system as claimed in claim 10, wherein the reaction gas is removed from an outlet of the secondary chamber for separation of reaction gas into product gas and a portion for further processing.
12. A system as claimed in claim 10, wherein reaction gas and tar removed from outlet of the tertiary chamber is reintroduced to the system at the inlet of the primary chamber.
13. A system as claimed in claim 1, wherein each of the primary chamber, secondary chamber and tertiary chamber comprises at least one barrel; and wherein each of the barrels comprises an auger for conveying the feedstock and reaction gas within each of the barrels.
14. A system as claimed in claim 13, further comprising resultant chambers between each of the serially connected barrels to provide buffering capacity.
15. A system as claimed in claim 13, further comprising a downstream induced fan that draws heated air through the heating jackets that are in fluid communication with each other.
16. A system as claimed in claim 15, further comprising shock absorbing mechanisms at connections between each of the heating jackets and barrels, as well as each of the barrels and chambers.
17. A system as claimed claim 16, wherein the shock absorbing mechanism is or comprises bellows.
18. A system as claimed in claim 1, further comprising an annulus comprising:
   a) walls comprising refractory material; and
   b) a burner box comprising burners;
   configured so that in use a uniform flow of gases flows over exterior surfaces of the chambers sequentially from secondary chamber to primary chamber or from tertiary chamber to secondary chamber to primary chamber.
19. A method for converting a carbonaceous feedstock into a reaction gas using at least one pyrolysis chamber, a secondary chamber, and a tertiary chamber; wherein the at least one pyrolysis chamber comprises a primary chamber; wherein each chamber has its own heating jacket that controls an operating temperature in each respective chamber, wherein the heating jackets are in fluid communication with each other such that heat from one chamber's heating jacket is drawn through one or more heating jackets of other chambers; the method comprising:

a. causing the primary chamber, secondary chamber and tertiary chamber to be serially and vertically stacked; and b. causing the primary chamber to operate at an operating temperature at or above 850° C., at a pressure between 0 and 1.5 bar gauge, at a gaseous residence time of 1-4 seconds, and at a solid residence time of more than 2 minutes, to promote the pyrolysis of feedstock.

20. The system of claim 1, wherein the vertically stacked chambers encourage circulation of hot gases among the heating jackets.

21. The system of claim 1, wherein the heating jackets are independently insulated.

22. The system of claim 1, wherein the tertiary chamber heating jacket uses waste heat exhausted by the secondary chamber heating jacket.

\* \* \* \* \*